US012578074B2

(12) United States Patent
Dir et al.

(10) Patent No.: US 12,578,074 B2
(45) Date of Patent: Mar. 17, 2026

(54) SYSTEM AND METHOD FOR PORTABLE, SAFETY LIGHTING

(71) Applicant: ARCHANGEL DEVICE LLC, Waukesha, WI (US)

(72) Inventors: Ronald R. Dir, Sturtevant, WI (US); Chadwick Keller, Brookfield, WI (US)

(73) Assignee: ARCHANGEL DEVICE LLC, Waukesha, WI (US)

( * ) Notice: Subject to any disclaimer, the term of this patent is extended or adjusted under 35 U.S.C. 154(b) by 0 days.

(21) Appl. No.: 18/224,468

(22) Filed: Jul. 20, 2023

(65) Prior Publication Data

US 2023/0375153 A1 Nov. 23, 2023

Related U.S. Application Data

(63) Continuation-in-part of application No. PCT/US2022/050964, filed on Nov. 23, 2022.

(60) Provisional application No. 63/390,740, filed on Jul. 20, 2022, provisional application No. 63/283,039, filed on Nov. 24, 2021.

(51) Int. Cl.

| | |
|---|---|
| ***F21V 5/04*** | (2006.01) |
| ***F21V 15/01*** | (2006.01) |
| ***F21V 23/04*** | (2006.01) |
| ***F21V 29/70*** | (2015.01) |
| ***F21Y 113/10*** | (2016.01) |

(52) U.S. Cl.

CPC ................ *F21V 5/04* (2013.01); *F21V 15/01* (2013.01); *F21V 23/0435* (2013.01); *F21V 29/70* (2015.01); *F21Y 2113/10* (2016.08)

(58) Field of Classification Search

CPC ........ F21V 5/04; F21V 15/01; F21V 23/0435; F21V 29/70; F21V 23/045; F21Y 2113/10; F21Y 2115/10; B60Q 1/2673; B60Q 5/006; B60Q 7/00; B60Q 2900/30; B63B 45/00; B62J 6/26; F21W 2111/00

See application file for complete search history.

(56) References Cited

U.S. PATENT DOCUMENTS

| | | | | |
|---|---|---|---|---|
| 7,088,222 B1 * | 8/2006 | Dueker | F21L 4/08 | 362/153.1 |
| 9,478,108 B2 * | 10/2016 | Matte | G08B 5/004 | |
| 9,920,888 B1 * | 3/2018 | Springer | H05B 45/30 | |
| 10,271,019 B1 * | 4/2019 | Berg | H04N 23/57 | |
| 11,920,775 B1 * | 3/2024 | Bruger | F21V 21/06 | |
| 2012/0287611 A1 * | 11/2012 | Wilson | F21L 4/08 | 362/183 |
| 2014/0133154 A1 * | 5/2014 | Ju | F21V 7/00 | 362/294 |

(Continued)

*Primary Examiner* — Tsion Tumebo

(74) *Attorney, Agent, or Firm* — QUARLES & BRADY LLP

(57) ABSTRACT

A light system includes a housing having a lens that forms a periphery of the housing. A lighting assembly is arranged within the housing and includes a plurality of lighting elements configured to emit light. The lens is configured to receive the light emitted by the plurality of lighting elements and to direct the light toward the periphery of the housing. A communication module is configured to communicate with an external device and an electronic controller is configured to activate the plurality of lighting elements in accordance with a signal received by the communication module.

21 Claims, 32 Drawing Sheets

(56) References Cited

U.S. PATENT DOCUMENTS

| | | | | |
|---|---|---|---|---|
| 2014/0285355 | A1* | 9/2014 | Matte | F21V 31/005 340/815.45 |
| 2015/0327349 | A1* | 11/2015 | Lee | F21K 9/232 362/373 |
| 2016/0186971 | A1* | 6/2016 | Selevan | H05B 47/105 362/234 |
| 2016/0351545 | A1* | 12/2016 | Hong | H01L 23/49827 |
| 2020/0217496 | A1* | 7/2020 | Dir | F21L 4/025 |
| 2021/0074606 | A1* | 3/2021 | Wang | H01L 24/19 |

* cited by examiner

SYSTEM AND METHOD FOR PORTABLE, SAFETY LIGHTING

CROSS-REFERENCE TO RELATED APPLICATIONS

This patent application claims the benefit of U.S. Provisional Patent Application 63/390,740, filed Jul. 20, 2022, and is a continuation-in-part of International Application PCT/US2022/50964, filed on Nov. 23, 2022, which claims the benefit of U.S. Provisional Patent Application 63/283,039, filed on Nov. 24, 2021, the entire contents of all of which is hereby incorporated by reference, for any and all purposes.

BACKGROUND

The present disclosure relates generally to safety lighting systems and methods. More specifically, the present disclosure relates to systems and methods for providing portable safety lighting, for example, that can be visible from at least three hundred sixty degrees around a particular location, or other features.

SUMMARY

In accordance with one aspect of the disclosure, a light system is provided. The light system can include a housing including a lens that forms a periphery of the housing. A lighting assembly can be arranged within the housing and can include a plurality of lighting elements configured to emit light. The lens can be configured to receive the light emitted by the plurality of lighting elements and to direct the light toward the periphery of the housing. A communication module can be configured to communicate with an external device and an electronic controller can be configured to activate the plurality of lighting elements in accordance with a signal received by the communication module.

In some examples, the housing can further include a first cap and a second cap arranged in opposition to the first cap. The lens can be arranged between the first cap and the second cap to form the periphery of the housing. The lighting assembly can be arranged proximate to the first cap and the plurality of lighting elements can be configured to emit light toward the second cap. The light emitted by the plurality of lighting elements can be visible for at least three hundred sixty degrees around the housing. In some cases, the second cap can include a magnet. A projection can extend outwardly from the second cap and the magnet is secured within the projection.

In some examples, the lighting assembly, the communication module, and the electronic controller can be coupled to a printed circuit board. The printed circuit board can include a first circuit layer, a second circuit layer, a first heat dissipation layer disposed between the first circuit layer and the second circuit layer, and a second heat dissipation layer disposed between the first circuit layer and the second circuit layer. The plurality of lighting elements can be coupled to the first circuit layer. Heat generated by the plurality of lighting elements can be dissipated through each of the first heat dissipation layer and the second heat dissipation layer.

In some examples, the electronic controller can be configured to activate the plurality of lighting elements at first brightness or with a first pattern corresponding to a first risk level, and to activate the plurality of lighting elements at a second brightness or with a second pattern corresponding to a second risk level.

In accordance with another aspect of the disclosure, a light system is provided. The light system can include a housing including a first cap, a second cap, and a lens arranged between the first cap and the second cap to form a periphery of the housing. A lighting assembly can be arranged within the housing. The lighting assembly can include a plurality of lighting elements configured to emit light toward the lens to be directed from the periphery of the housing so that the light is visible at least three hundred sixty degrees around the housing. A communication module can be configured to communicate with an external device and an electronic controller can be configured to transition the light system between a standby state and an active state in accordance with a signal received by the communication module.

In some examples, the electronic controller is configured to activate a first function of the light system in the active state in accordance with a first risk level. The first function can include the plurality of lighting elements. The electronic controller can be further configured to activate a second function of the light system active state in accordance with a second risk level. The second function can include activating at least one of the plurality of lighting elements and a speaker configured to emit an auditory signal.

In some examples, the lens can include a waveguide having a reflecting surface that can be configured to receive the light emitted by the plurality of lighting elements and to direct the light toward the periphery of the housing. In some cases, the lighting system can further include a connection interface configured to couple to a support structure. In some cases, the lighting system can further include a control interface configured to allow user to control one or more functions of the lighting device. The control interface can include at least one of a physical control interface and a virtual control interface.

In accordance with yet another aspect of the disclosure, a light system is provided. The light system can include a housing including a first cap, a second cap, and a lens arranged between the first cap and the second cap to form a periphery of the housing. The lens can include a plurality of light collecting structures. A circuit board can be positioned between the first cap and the lens and a plurality of lighting elements can be coupled to the circuit board. The plurality of lighting elements can be arranged to emit light toward the plurality of light collecting structures so that the light is directed from the periphery of the housing. The light system can further include communication module configured to communicate with an external device.

In some examples, the plurality of lighting elements can be configured to emit light toward the second cap. The lens can include a waveguide having a reflecting surface that can be configured to receive the light emitted by the plurality of lighting elements and to direct the light from the periphery of the housing.

In some examples, the lighting system can further include an electronic controller that can be configured control the emission of light from the plurality of lighting elements based on a signal received by the communication module from the external device. The external device can include a user interface configured to allow a user to control the emission of light from the plurality of lighting elements.

In accordance with still another aspect of the disclosure, a light system is provided. The light system can include an external device including a control interface, a first lighting device, and a second lighting device. Each of the first lighting device and the second lighting device can include a housing including a first cap, a second cap, and a lens arranged between the first cap and the second cap to form a periphery of the housing. The lens including a plurality of light collecting structures. A circuit board can be positioned between the first cap and the lens and a plurality of lighting elements can be coupled to the circuit board. The plurality of lighting elements can be arranged to emit light toward the plurality of light collecting structures so that the light is directed from the periphery of the housing. Further, each of the first lighting device and the second lighting device can include a communication module that can be configured to communicate with the external device.

In some examples, the plurality of lighting elements of the first lighting device can include a plurality of white lighting elements. The plurality of lighting elements of the second lighting device can include a plurality of red lighting elements and a plurality of green lighting elements.

DETAILED DESCRIPTION

Figure 1:
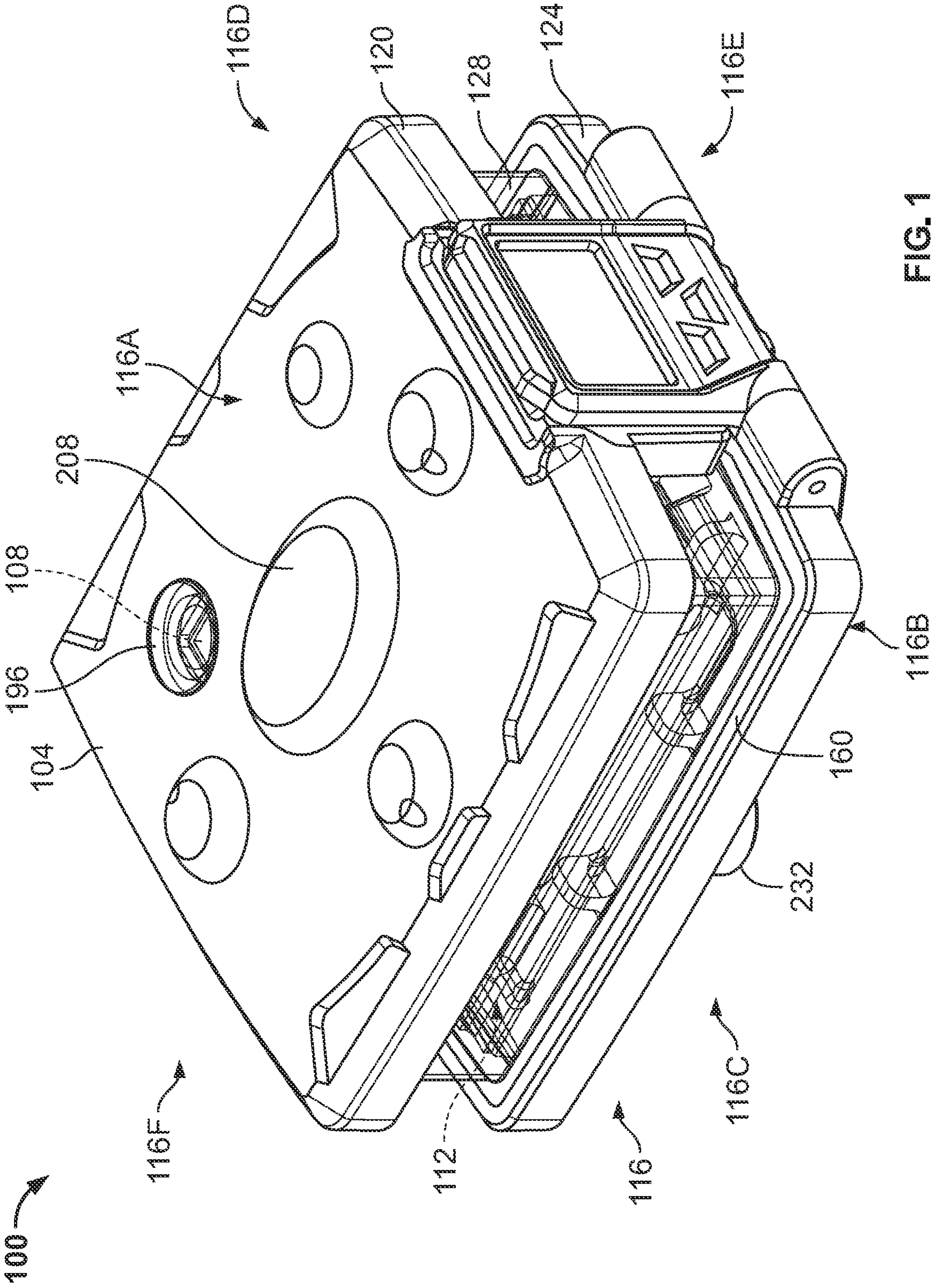
FIG. 1 is a top, front, and left isometric view of an exemplary safety light according to aspects of the present disclosure.
Figure 2:
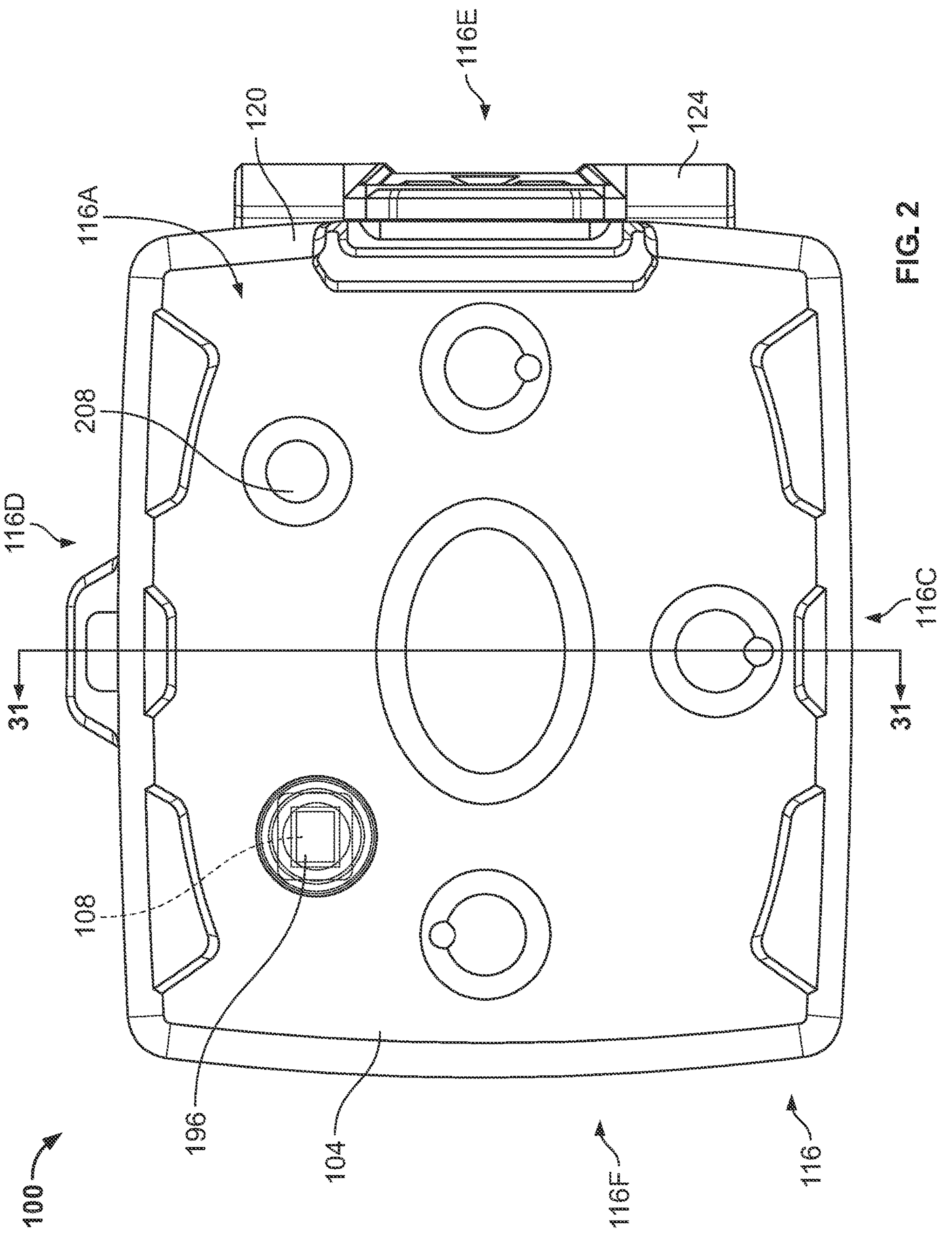
FIG. 2 is a top side plan view of the safety light of FIG. 1.
Figure 3:
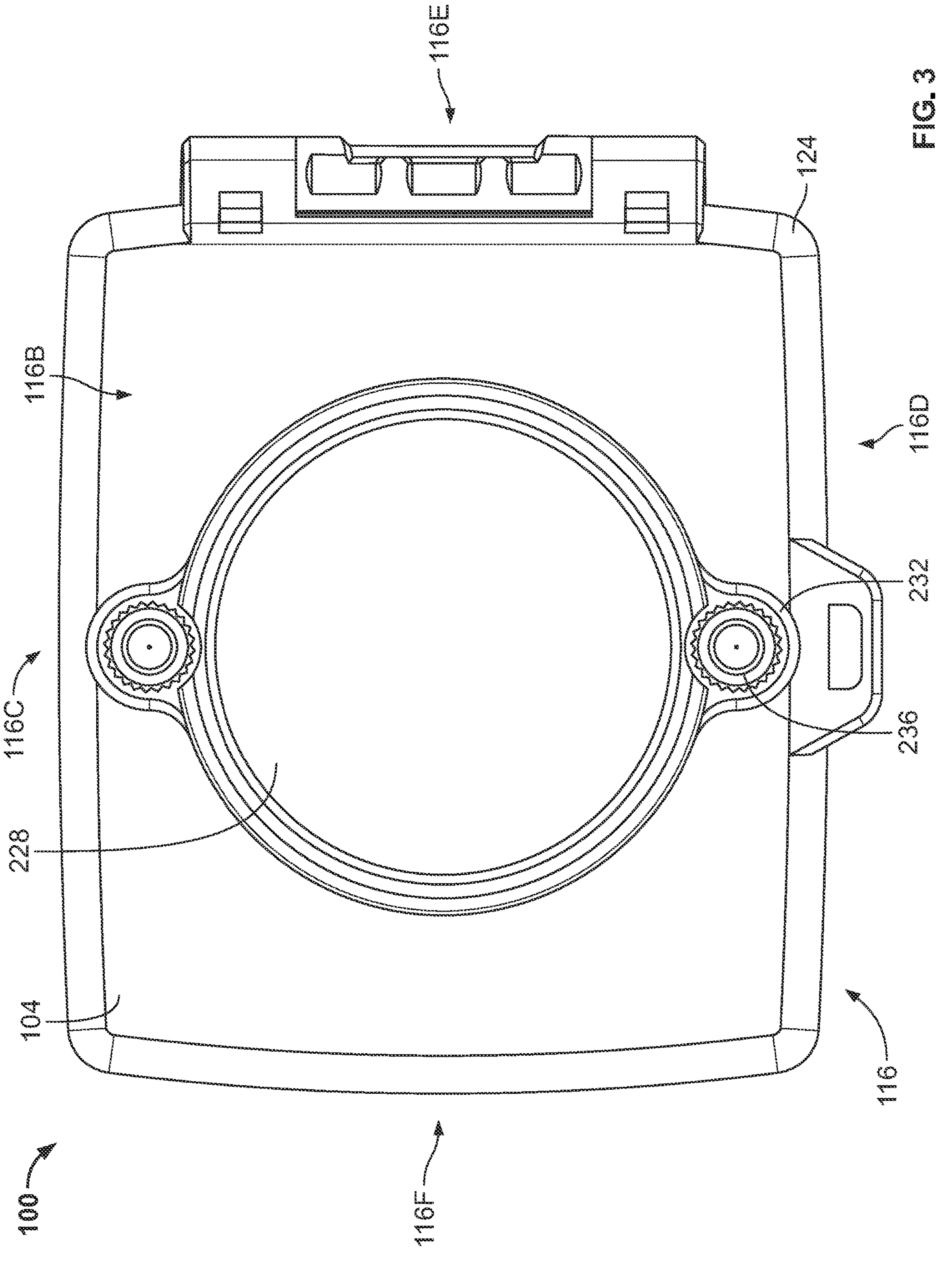
FIG. 3 is a bottom side plan view of the safety light of FIG. 1.
Figure 4:
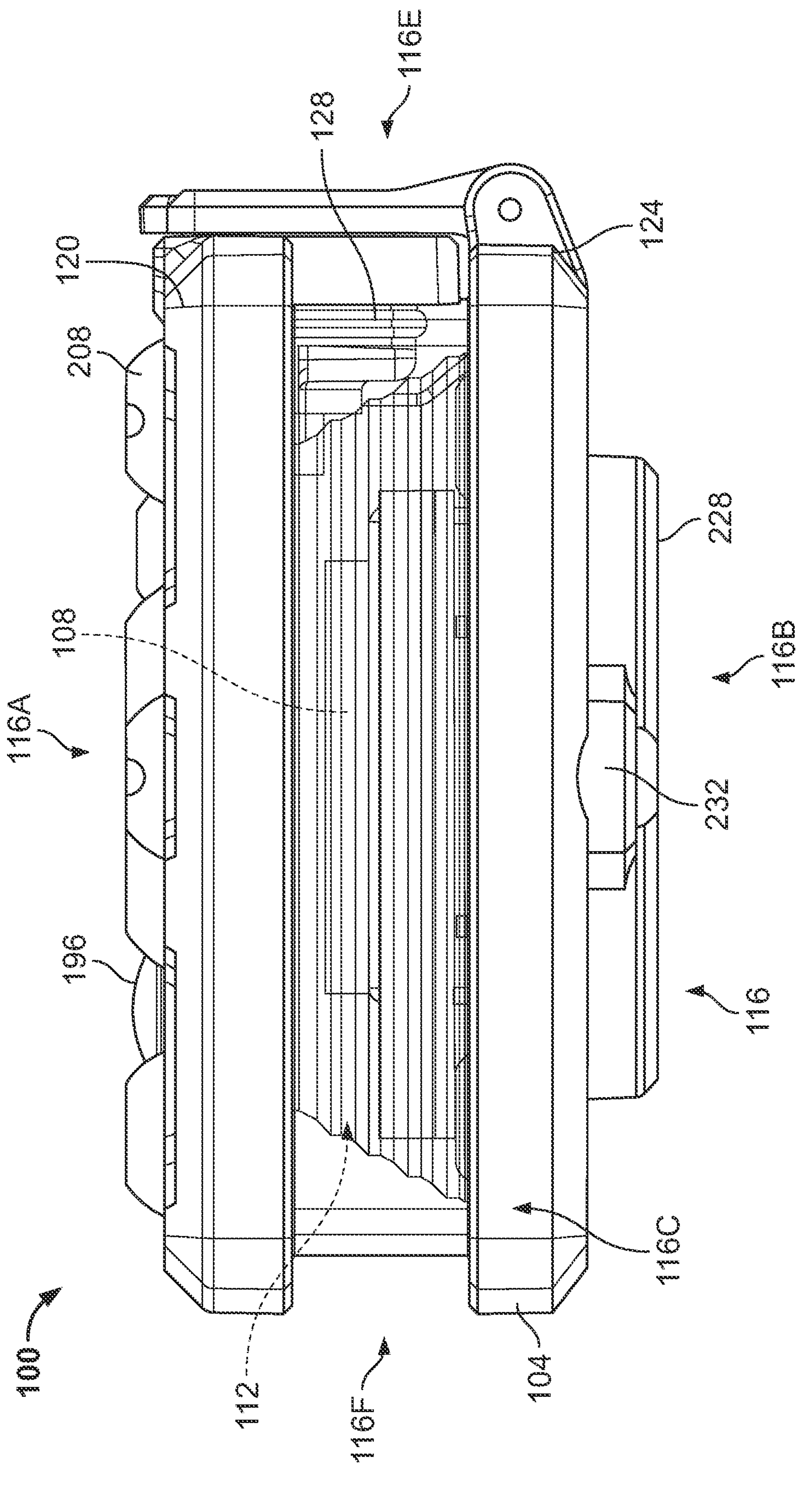
FIG. 4 is a front side plan view of the safety light of FIG. 1.
Figure 5:
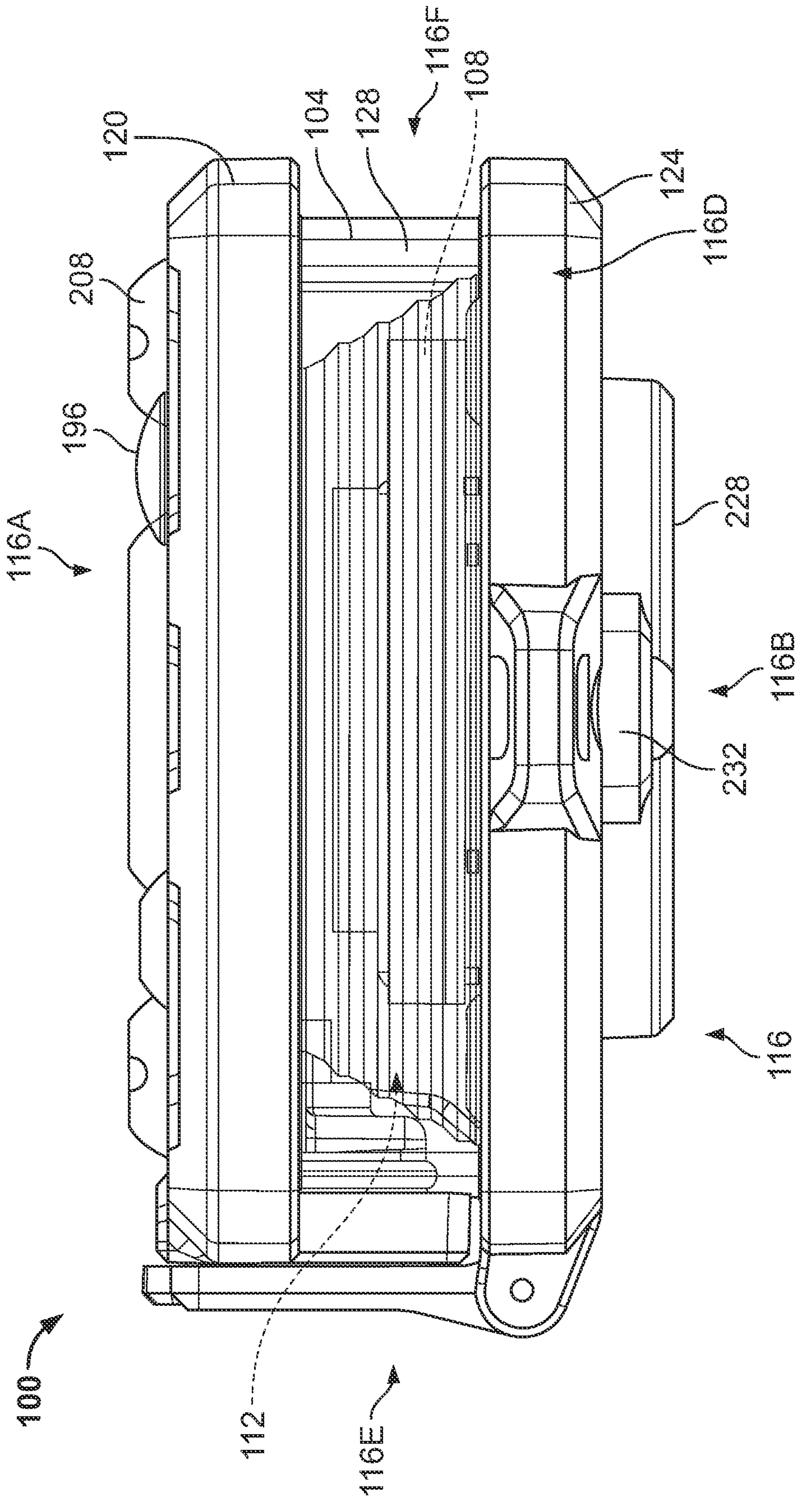
FIG. 5 is a back side plan view of the safety light of FIG. 1.
Figure 6:
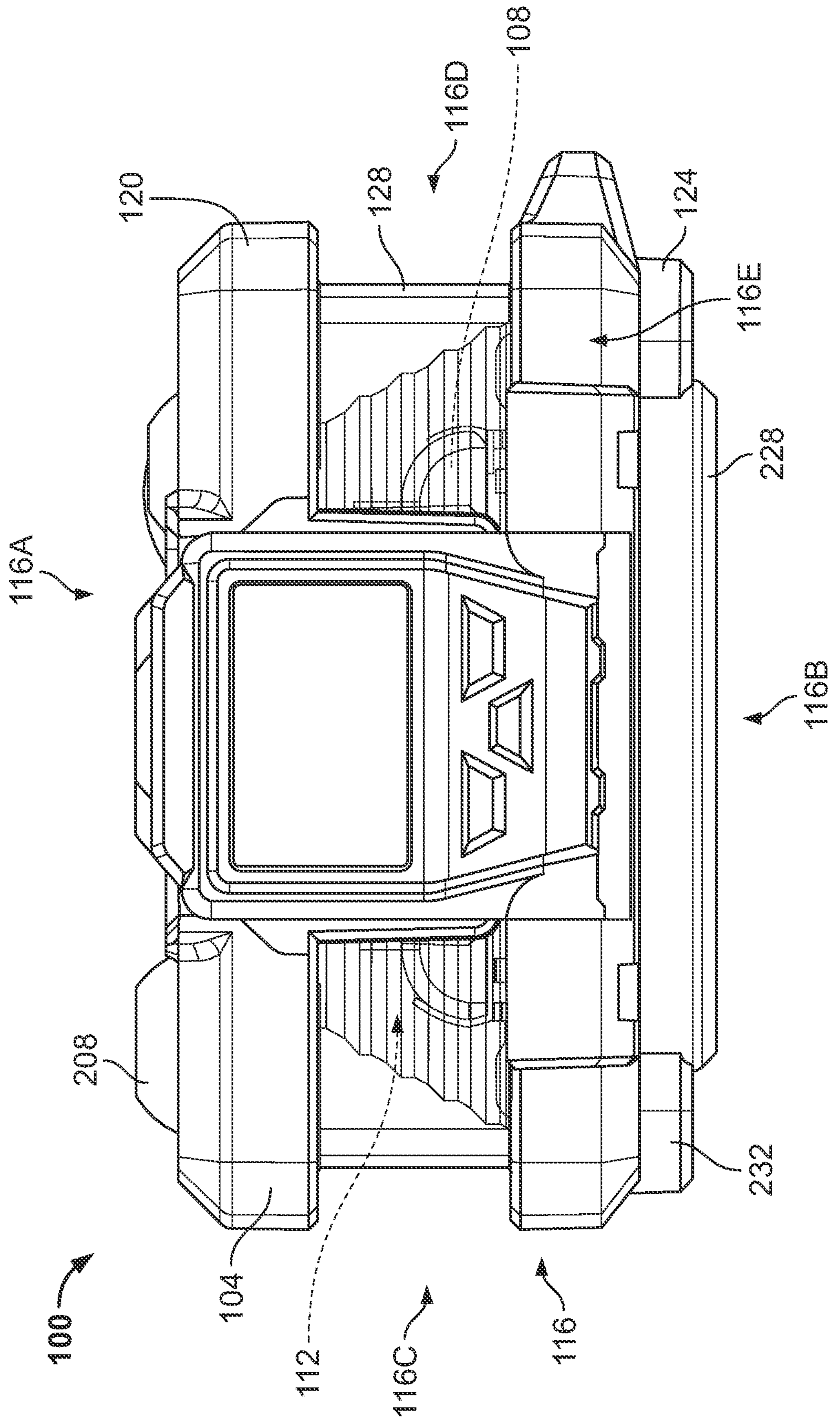
FIG. 6 is a left side plan view of the safety light of FIG. 1.
Figure 7:
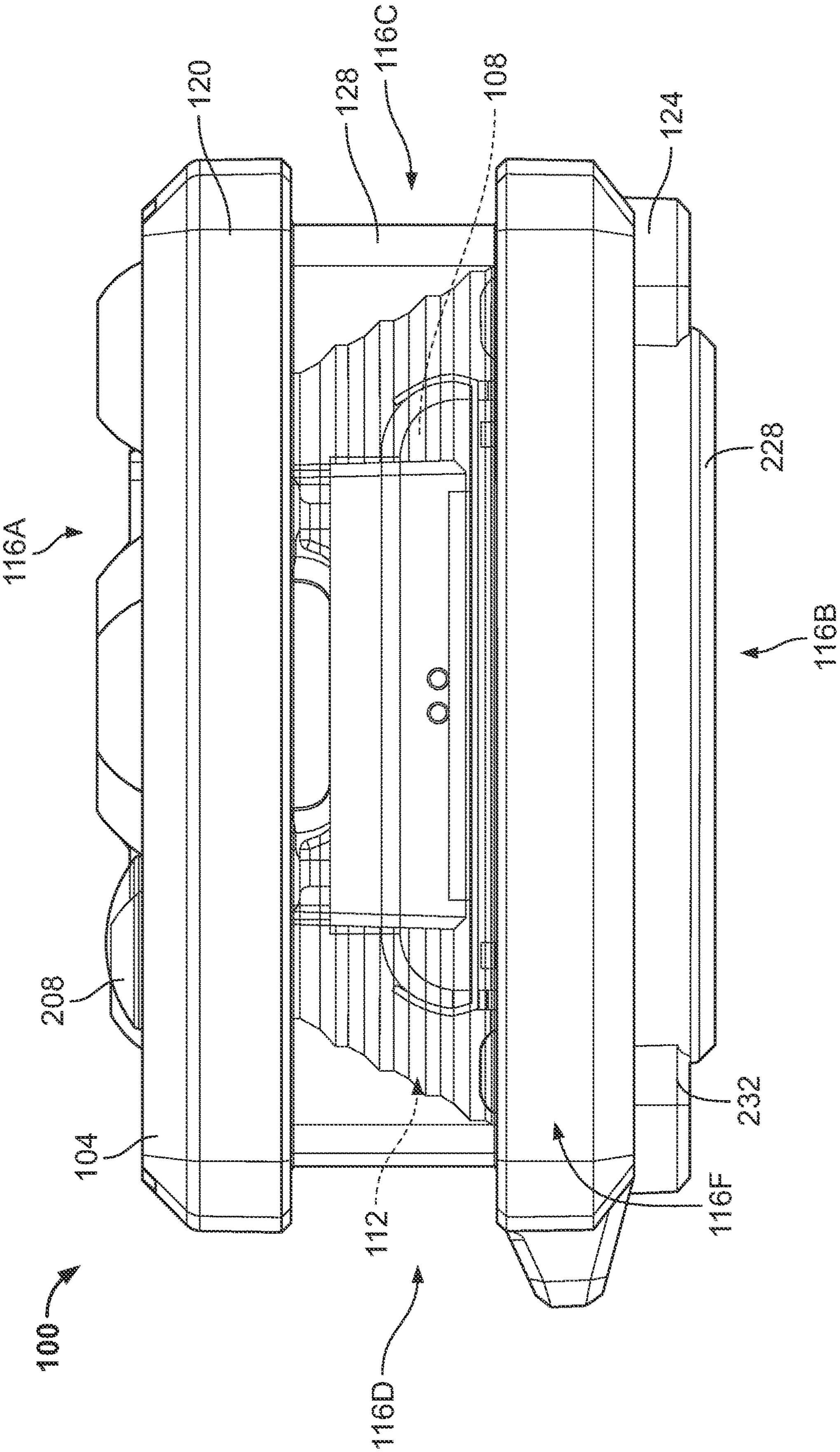
FIG. 7 is a right side plan view of the safety light of FIG. 1.
Figure 8:
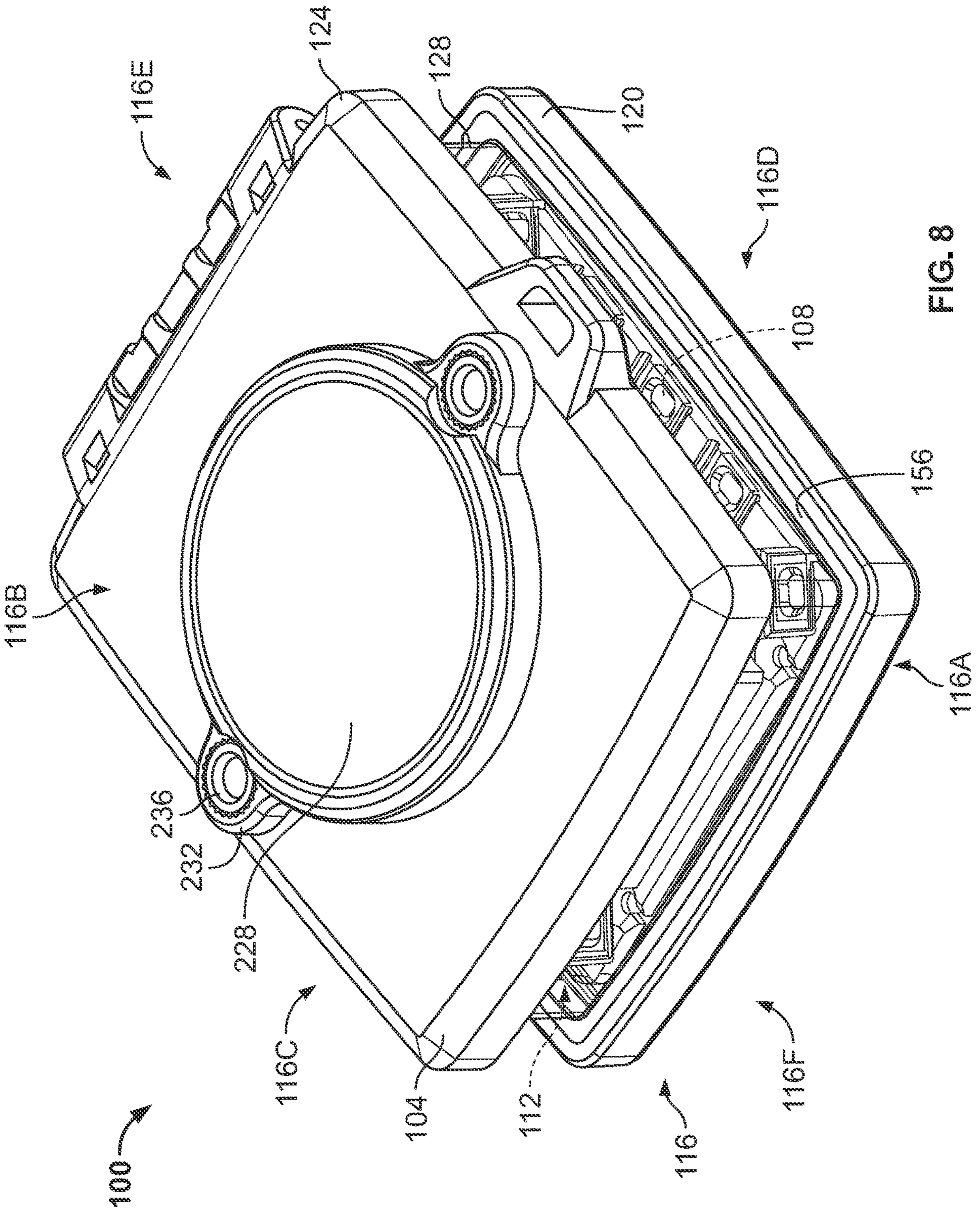
FIG. 8 is a bottom, back, and right isometric view of the safety light of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The term "about," as used herein, refers to variations in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIGS. 1-10 illustrate a lighting device according to aspects of the disclosure. The lighting device may be being configured as a safety light. Safety lights may include an emergency beacon, construction lighting, police or fire lighting, ambulance lighting, or any of a variety of personal lighting. For example, personal lighting may include lighting worn on a person or integrated into clothing or otherwise mounted on a person. This may include lighting mounted to hats, including hard hats. Personal lighting may also be integrated with or mounted on personal transportation, such as on bicycles, kayaks, snowmobiles, off-road vehicles, boats, or other transportation systems. Personal lighting may also be integrated with specialized equipment, for example, such as skiing or snowboarding equipment, camping hiking, or fishing equipment.

Thus, in many configurations, the safety light 100 is configured as portable. In some situations, the safety light 100 may be a wearable or mountable light that can be worn by a user during use or otherwise carried with user equipment. In other situations, the safety light 100 may be integrated with or mounted on a vehicle, including a car, boat, construction equipment, or other motorized and non-motorized vehicles. Irrespective of the particular use or configuration, the safety light 100 is a portable light that can be moved or mounted to a desired location by a user. That is, the safety light 100 can be mounted to a variety of support surfaces and/or structures, for example, a piece of equipment, a vehicle (motorized or unmotorized), or other type support surface.

A lighting device (e.g., the safety light 100) is generally configured to emit light. Light can be emitted from the safety light in multiple directions. For example, light can be emitted from around at least a perimeter (i.e., an outer perimeter) of the safety light 100. Accordingly, a lighting device can be configured to direct light around an entire perimeter (i.e., a periphery) of the lighting device. Put another way, the light being emitted from the lighting device can be viewed from at least three hundred sixty degrees around the lighting device.

Light emitted from a lighting device (e.g., the safety light 100) can be configured to be light of one or more colors, including both visible and non-visible light (e.g., infrared light and UV light) and the light can be emitted constantly or intermittently. For example, a lighting device can be configured to flash or blink to cause light can be emitted in regular patterns and/or in irregular patterns. In some cases, light can be emitted to provide a signal to others. In particular, light can be emitted in accordance with Morse code to send a variety of messages, included by not limited to, an SOS signal. The emission of a light can also be used to convey messages to a user, for example, to indicate a battery level. Moreover, a lighting device can be configured to provide light with different characteristics, for example, beams (e.g., columnated beams) of light, diffused or scattered light, and any combinations thereof. Similarly, a lighting device can be configured to produce light of one or more intensity (i.e., brightness). In that regard, a lighting device can be configured to produce light at discrete intensities, or over a continuous range of intensities. The characteristic of light emitted by a lighting device can be selectable be a user and can therefore be adjusted in accordance with operating conditions and the needs of the user.

In that regard, a lighting device can generally include a housing and a lighting assembly that can be configured to produce the light emitted by the lighting device. The housing can define an interior space (e.g., an enclosed interior space) and the lighting assembly can be disposed within the housing. In this way, a housing can be a protective housing that is configured to protect the lighting assembly disposed therein. For example, with continued reference to FIGS. 1-10, the safety light 100 generally includes a housing 104 and a lighting assembly 108, which produces light that is emitted by the safety light. More specifically, the housing 104 generally defines an interior space 112 and the lighting assembly 108 can be retained within the housing 104. Accordingly, the housing 104 can provide protection to the comparatively sensitive and fragile components of the lighting assembly 108, allowing the safety light 100 to be used in variety of harsh environments, for example, construction sites, factories, mines, and more generally, outdoor environments. To that end a lighting device can withstand impacts, elevated and below-freezing temperatures, and ingress from water, particulate matter (e.g., dust and debris). Further, depending on the specific use, a lighting device can be configured to be resistant to various chemicals (e.g., types of chemicals). Moreover, a lighting device can configure to meet or exceed various industry safety standards. For example, a lighting device can be certified as "Intrinsically Safe," in that the lighting device is explosion proof and/or ATEX certified. Such certifications and industry standards may be particularly relevant for use in the oil & gas, energy, and subterranean mining industries.

Correspondingly, to provide the housing 104 with sufficient strength and structural integrity, while also being light weight and portable, the housing 104 can be made from polymers, such as fiber-reinforced polymers, (e.g., glass fiber or carbon fiber reinforced polymers), or metals (e.g., magnesium, titanium, aluminum, and various alloys). However, in other embodiments, a housing can be made of any other material, as is suitable for a specific application. Further, in other embodiments, a housing can include protective coatings, such as, paint, ultraviolet light resistive coatings, chemically resistive coatings, camouflage dipping, and dura-coatings.

A lighting device configured in a variety of shapes. That is, a housing for a lighting device can be formed with a variety of shapes. For example, in the illustrated embodiment, the housing 104 is configured as generally cuboid body, and more specifically, a rectangular cuboid. Put another way, the housing 104 can have sides that may not be perfectly flat, but rather have a curvature, which may aid in the emission of light from the housing 104. In that regard, the housing 104 generally defines six sides (collectively, the sides 116 of the housing 104), namely, a top or first side 116A opposite and substantially parallel a bottom or second side 116B, a front or third side 116C opposite and substantially parallel a back or fourth side 116D, and a left or fifth side 116E opposite and substantially parallel a right or sixth side 116F. Each of the third side 116C, the fourth side 116D, the fifth side 116E, and the sixth side 116F extend substantially perpendicularly between the first side 116A and the second side 116B. Likewise, each of the third side 116C and the fourth side 116D extend substantially perpendicularly between the fifth side 116E and the sixth side 116F. In other embodiments, a housing can be shaped differently, including being shaped as different regular or irregular polyhedrons (e.g., platonic solids, pyramids, and prisms, etc.), or as non-polyhedrons, for example, cylinders, hemispheres, toruses, etc.

A housing can include one or more sub-components that can be coupled to one another to form the housing. In some cases, a housing and any components thereof may define an interior space of the housing. Such an interior space can provide an area for one or more components of lighting assembly. Relatedly, to allow light to be emitted, a housing generally includes a lens. A lens can be transparent or translucent element that can allow light to pass through. In doing so, a lens can affect various aspects of the light passing through the lens (e.g., columniation, diffusion, intensity, direction, dispersion patterns, etc.), A lens can extend along an outer perimeter of housing so that the lens defines a periphery of a lighting device (e.g., and outer periphery). Such a lens can extend along and form an entire periphery of a housing of a lighting device. However, this may not always be the case and a lens may only extend along a portion of a periphery of a housing of lighting device. Accordingly, so that light can be viewed from at least three hundred sixty degrees around the lighting device, a lighting device can include multiple lenses.

For example, as illustrated in FIGS. 1-10, the housing 104 includes a top or first cap 120, a bottom or second cap 124, and a lens 128 (i.e., a main or primary lens). The first cap 120 extends along and generally defines the first side 116A of the housing 104, although some portions of the first cap 120 may extend onto other sides 116 of the housing 104 (e.g., the third side 116C, the fourth side 116D, the fifth side 116E, and the sixth side 116F). The second cap 124 can be arranged in opposition to the first cap 120. Correspondingly, the second cap 124 can extend along and generally define the second side 116B of the housing 104, but may also extend onto other sides 116 of the housing 104 (e.g., the third side 116C, the fourth side 116D, the fifth side 116E, and the sixth side 116F).

The lens 128 is configured as an annulus, which may be a square annulus, or form a ring-like lens. More specifically, the lens 128 is configured as a rectangular annulus having a rectangular outer profile comprised of four sidewalls 132, which together, define an opening 136 (e.g., a central opening). The shape of the lens 128 can provide the safety light 100 with an optically transparent perimeter that allows light from the lighting assembly 108 to be observed from at least three hundred sixty degrees around the safety light 100. That is, the shape of the lens 128 can allow light to be emitted around an entire perimeter of the safety light 100. Accordingly, the lens can be made of a transparent or translucent material, for example, a polymer (e.g., polycarbonate, PMMA, acrylic, transparent ABS (MABS), and urethanes (Trivex®)) or a non-polymeric material (e.g., glass, such as borosilicate glasses, and optical silicones). Further details regarding the transmission (i.e., emission) of light through the lens 128 will be described in greater detail below. In some embodiments, a lens as described herein can be a single or monolithic lens; however, multiple lenses arranged to provide similar lighting characteristics are also contemplated and are within the scope of the present disclosure.

A lens can be disposed between components of a housing to extend form to periphery of the housing. For example, a lens can be disposed between a first cap and a second cap, or between other components, to form a periphery of a housing (e.g., and entire or a partial periphery). The lens can be connected directly to one or both of the first cap or the second cap, or there can be one or more intermediate structures therebetween. Relatedly the lens can act as a structural component of a housing of a lighting device. In the illustrated example, the lens 128 is disposed and extends between the first cap 120 and the second cap 124 to define the third side 116C, the fourth side 116D, the fifth side 116E, and the sixth side 116F or the housing 104. Accordingly, the lens 128 includes a first sidewall 132A, a second sidewall 132B, a third sidewall 132C, and fourth sidewall 132D that correspond with each of the third side 116C, the fourth side 116D, the fifth side 116E, and the sixth side 116F of the housing, respectfully. Together, the sidewalls 132 define a top or first side 140A that is proximate the first cap 120 and opposite a bottom or second side 140B that is proximate the second cap 124. Further, the opening 136 of the lens 128 extends generally between the first side 116A and the second side 116B of the housing 104. Correspondingly, the opening 136 is closed along the first side 116A by the first cap 120 and is closed along the second side 116B by the second cap 124 to define the interior space 112 of the housing 104.

Figure 11:
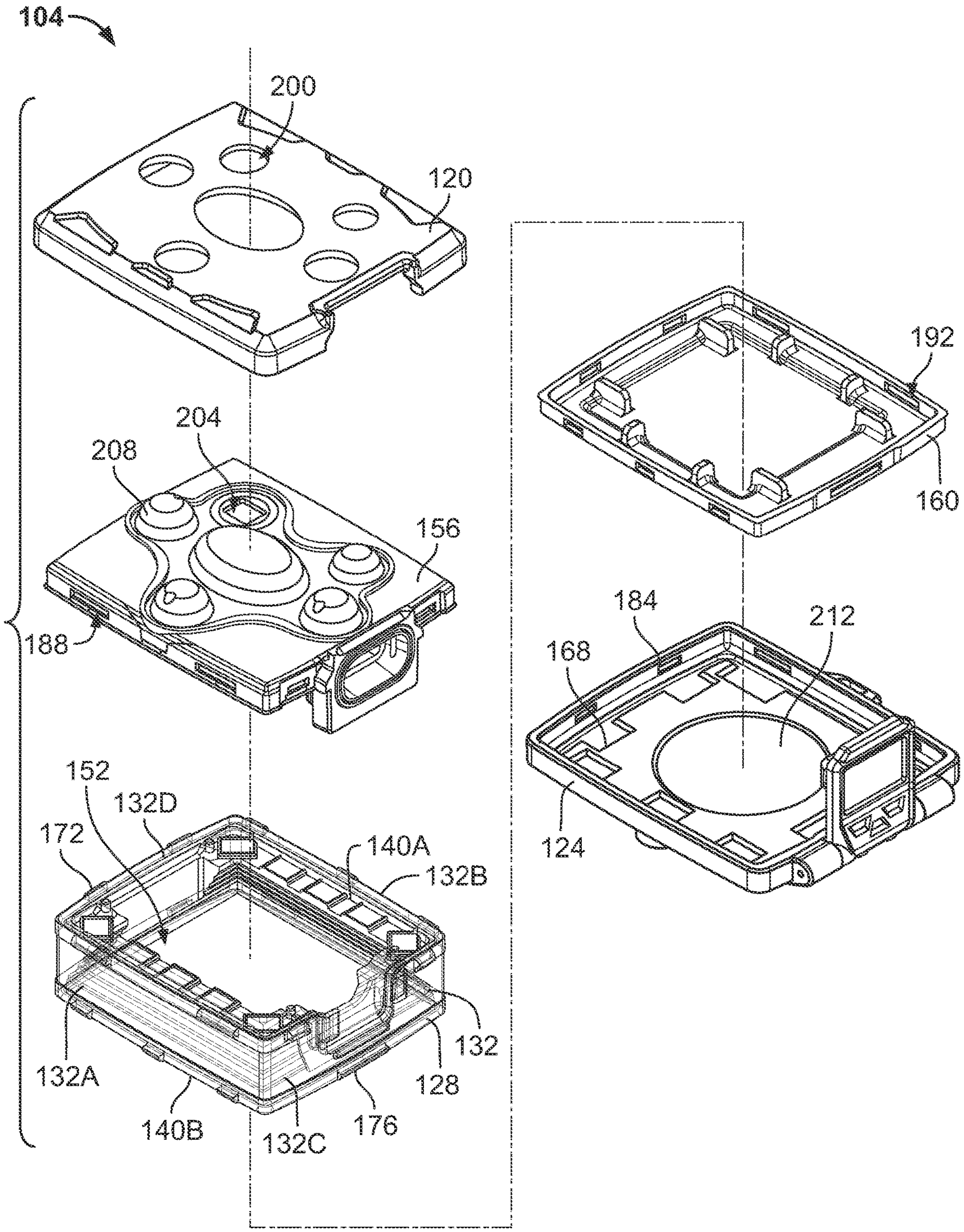
FIG. 11 is an exploded view of a housing of the safety light of FIG. 1.
Figure 12:
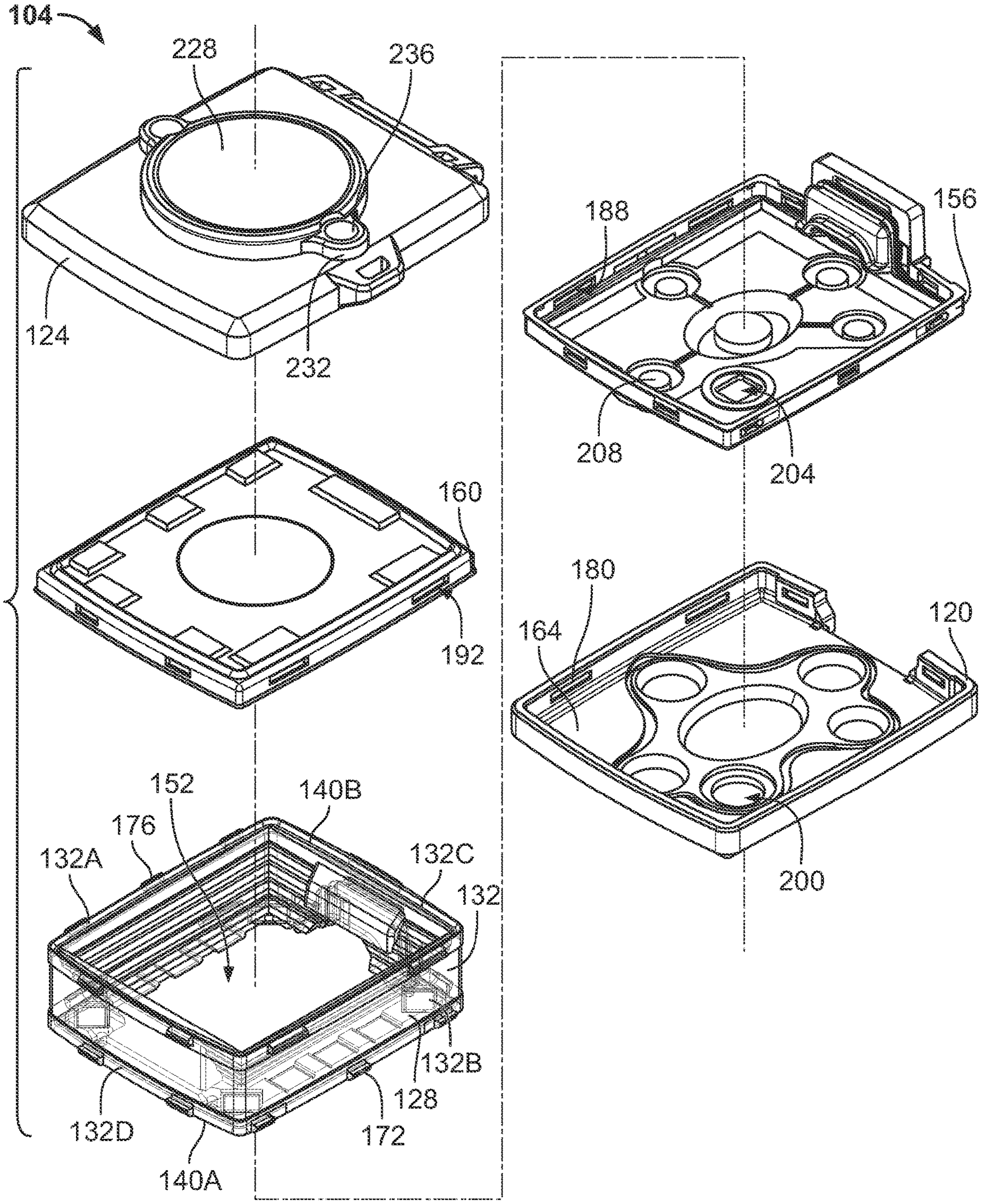
FIG. 12 is an exploded view of a housing of the safety light of FIG. 8.

As mentioned above, the components that make up a housing can be coupled together to form the housing. For example, lens can be coupled to one or both of a first cap and a second cap (e.g., removably or permanently coupled). In other cases, one or more components of a housing can be integrally formed. For example, a lens can be co-molded, fused, or otherwise joined with one or both of a first cap, a second cap, or other components, such as a seal or gasket. In any case, a lens can thereby extend between various components of a housing. With additional reference to FIGS. 11 and 12, the lens 128 is coupled with each of the first cap 120 and the second cap 124 via snap-fit connections. In particular, the lens 128 includes a plurality of protrusions that are configured to engage with corresponding slots or depressions formed in each of the first cap 120 and the second cap 124. More specifically, the lens defines a top or first plurality of protrusions 172 extending outwardly (i.e., away from the opening 136) from sidewalls 132 proximate the first side 140A of the lens 128, and thus the first cap 120, and a bottom or second plurality of protrusions 176 extending outwardly (i.e., away from the opening 136) from sidewalls 132 proximate the second side 140B of the lens 128, and thus the second cap 124.

Accordingly, the first cap 120 defines a plurality of first cap slots 180 formed along an inner perimeter of the first cap recess 164. The first cap recess 164 is shaped to receive at least a portion of the sidewalls 132 of the lens 128 so that each of the first plurality of protrusions 172 engages with a corresponding one of the plurality of first cap slots 180, providing a snap-fit connection between the first cap 120 and the lens 128. Similarly, the second cap 124 defines a plurality of second cap slots 184 formed along an inner perimeter of the second cap recess 168. The second cap recess 168 is shaped to receive at least a portion of the sidewalls 132 of the lens 128 so that each of the second plurality of protrusions 176 engages with a corresponding one of the plurality of second cap slots 184, providing a snap-fit connection between the second cap 124 and the lens 128.

Relatedly, the first plurality of protrusions 172 and the second plurality of protrusions 176, along with the corresponding first cap slots 180 and second cap slots 184, can be configured to orient the lens 128 with respect to each of the first cap 120 and the second cap 124. In particular, the first sidewall 132A includes two first protrusions along the first side 140A and three second protrusions along the second side 140B, the second sidewall 132B includes three first protrusions along the first side 140A and two second protrusions along the second side 140B, the third sidewall 132C includes two first protrusions along the first side 140A and one second protrusion along the second side 140B, and the fourth sidewall 132D includes two first protrusions along the first side 140A and two second protrusions along the second side 140B. Accordingly, the first cap 120 can only be coupled to the lens 128 along the first side 116A and the second cap 124 can only be coupled to the lens 128 along the second side 116B. Additionally, the size of each protrusion or subset of protrusions can differ to provide similar alignment functionality. In other embodiments, the respective positions and orientations of the first cap 120 and the second cap 124 relative to the lens 128, may not be so limited. For example, the first cap 120 and the second cap 124 may be interchangeable with one another.

In other embodiments, components of a housing may be coupled together in other ways. For example, components of a housing can be coupled together using fasteners or an adhesive. Alternatively, or additionally, some components of a housing can be fused together. In that regard, components of a housing can be permanently or removably coupled together.

In some cases, a lighting device can be configured to prevent or reduce ingress of contaminants. In particular, a housing of a lighting device can include various gaskets, seals, coatings, or other features to prevent the ingress of contaminants such as particulate matter (e.g., dust, dirt, and other debris) and liquids (e.g., water, oils, etc.). In yet other cases, lighting devices can be air- or gas-tight to prevent gases from passing into a housing of the lighting device. In that regard, a lighting device can be filled with a substance, such as an inert gas, air, or potting compound, which can aid in protecting internal components from damage (e.g., corrosion, short circuits, and broken components)

For example, continuing with reference to FIGS. 1-12, a housing of safety light can be configured as a water and/or dust proof housing. Accordingly, a housing can be provided with one or more gaskets, which can seal the housing to prevent the ingress of dust, liquids, and/or other contaminants. The one or more gaskets can be configured as separate components, or they can be integral (e.g., co-molded) with a housing. For example, as illustrated, the safety light 100 includes a first gasket 156 and a second gasket 160 that are configured to prevent the ingress of contaminants between the first cap 120 and the lens 128, and between the second cap 124 and the lens 128, respectively. Each of the first gasket 156 and the second gasket 160 can be made of a resilient material (e.g., rubber or polymer), which can be compressed between the lens 128 and each of the first cap 120 and the second cap 124 to form a seal.

More specifically, the first gasket 156 is configured extend between the lens 128 and the first cap 120, including along the opening 136 (i.e., so that the first gasket 156 covers the opening 136 along the first side 140A of the lens 128). Put another way, first gasket 156A is shaped to fit within the first cap recess 164. Additionally, the first gasket 156A can be configured to couple to the lens 128. In particular, the first gasket 156 includes a plurality of first gasket slots 188 that are configured to receive a corresponding one of the first plurality of protrusions 172. Accordingly, the first plurality of protrusions 172 pass through the plurality of first gasket slots 188 to retain the first gasket 156A on the lens 128, while still allowing the first plurality of protrusions 172 to engage with the plurality of first cap slots 180. Thus, the first gasket 156 is retained within the first cap recess 164 and is disposed between the first cap 120 and the lens 128 to form a seal therebetween.

Similarly, the second gasket 160 is configured extend between the lens 128 and the second cap 124, including along the opening 136 (i.e., so that the second gasket 160 covers the opening 136 along the second side 140B of the lens 128). Put another way, second gasket 160 is shaped to fit within the second cap recess 168. Additionally, the second gasket 160 can be configured to couple to the lens 128. In particular, the second gasket 160 includes a plurality of second gasket slots 192 that are configured to receive a corresponding one of the second plurality of protrusions 176. Accordingly, the second plurality of protrusions 176 pass through the plurality of second gasket slots 192 to retain the second gasket 160 on the lens 128, while still allowing the second plurality of protrusions 176 to engage with the plurality of second cap slots 184. Thus, the second gasket 160 is retained within the second cap recess 168 and is disposed between the second cap 124 and the lens 128 to form a seal therebetween.

A lighting device can be configured to emit light beyond a single perimeter or perish of the lighting device. For example, a lighting device can be configured to emit light along a periphery as well as above and/or below that periphery. To allow light to be emitted in this way, a lighting device can include additional (i.e., secondary, tertiary, and quaternary) lenses or lens elements. Such additional lenses can be configured to emit light in a different direction from a main lens, and accordingly, can be disposed anywhere on housing of a lighting device. Relatedly, such lens can be configured to provide light adapted for use in specific applications, such as, a work light, flashlight, emergency beacon (e.g., a signal light), and laser pointer.

For example, with continued reference to FIGS. 1-10, the housing includes a second lens 196 that can be coupled to (i.e., matingly received by) the housing 104, and more specifically, the first cap 120. Accordingly, the first cap 120 is provided with a first cap opening 200 that is configured to receive and locate the second lens 196, thereby allowing light to be emitted out of the housing 104 via the second lens 196. Relatedly, the second lens 196 can be disposed between the first gasket 156 and the first cap 120, so as to maintain the seal provided by the first gasket. Correspondingly, the first gasket 156 can include a first gasket hole 204 to allow light to pass from the lighting assembly 108, through the first gasket hole 204, and out of the second lens 196. The second lens 196 can be configured to provide a specific type of light output. For example, the second lens 196 can be configured as a convex lens to provide a concentrated beam of light for use as spotlight or flashlight, or can be configured as a concave lens to provide a diffuse, widely spread light for use as a work light. In other embodiments, one or more additional lenses can be included, and a housing can be configured to allow light to be emitted through the additional lenses. For example, in the illustrated embodiment the second lens 196 is a convex lens configured to focus light from lighting element into a concentrated beam. In other embodiments, a second lens can be used for other purposes. For example, a second lens can provide an optically clear path to allow a camera installed within a housing to capture still images or video A lighting device can generally include a user interface (i.e., a control interface) configured to allow a user to control a one of more functions of the lighting device. In particular a user can control the emission of light from the lighting device. That is, the control interface can allow a user to control the emission of light from a lighting assembly of the lighting device. Such control interface can be configured as physical control interfaces (e.g., buttons, switches, toggles)

that are physically manipulated by a user, or as a virtual interface (e.g., buttons or other types of icons on a screen, such as a touchscreen or similar interfaces implemented via an augmented reality device). Relatedly, a user interface can be provided both on a lighting device and as a remote interface (e.g., as a user interface on a remote device). For example, with continued reference to FIGS. 1-12, the housing 104 includes a plurality of buttons 208 that are configured to control one or more functions of the safety light 100 (e.g., controlling the emission of light from one or more lighting elements of the lighting assembly 108, indicating a battery level, etc.).

In the illustrated embodiment, the buttons 208 are integrally formed with the first gasket 156. Accordingly, the first cap 120 defines a corresponding plurality of holes, which are shaped to allow the respective buttons 208 to pass through the first cap 120 to be depressed by a user. When one of the buttons 208 is depressed, the button 208 can interact with, and thereby control, the lighting assembly 108. For example, the button 208 may operate a physical (e.g., a mechanical switch), or an electrical switch (e.g., a capacitive switch) of the lighting assembly 108. As illustrated, the size and location of any buttons can be varied depending on the specific implementation. Alternatively, or additionally, other types of control interfaces can be used. In particular, a safety light or other lighting device can be configured to communicate with an application installed on user's phone or other remote device, such as remote control device or a central control system that can control multiple safety lights. That is, the control interface can allow a user to selectively control multiple safety lights (e.g., a first safety light and a second safety light) to produce a desired emission of light. For example, a light system can be configured for use in watercraft applications (motorized or manually driven) and can include a first safety light configured as a navigation light (e.g., with red and green lighting elements, each configured to emit light from a respective half of a perimeter of the lighting device) and a second safety light configured as an all-round or anchoring light (e.g., white lighting elements configured to emit light from an entire perimeter of the lighting device), which can be remotely controlled by a user using a remote control device. In other applications, other types of lights can also be used, including, for example, docking lights, work lights, fishing lights, etc.

Figure 13:
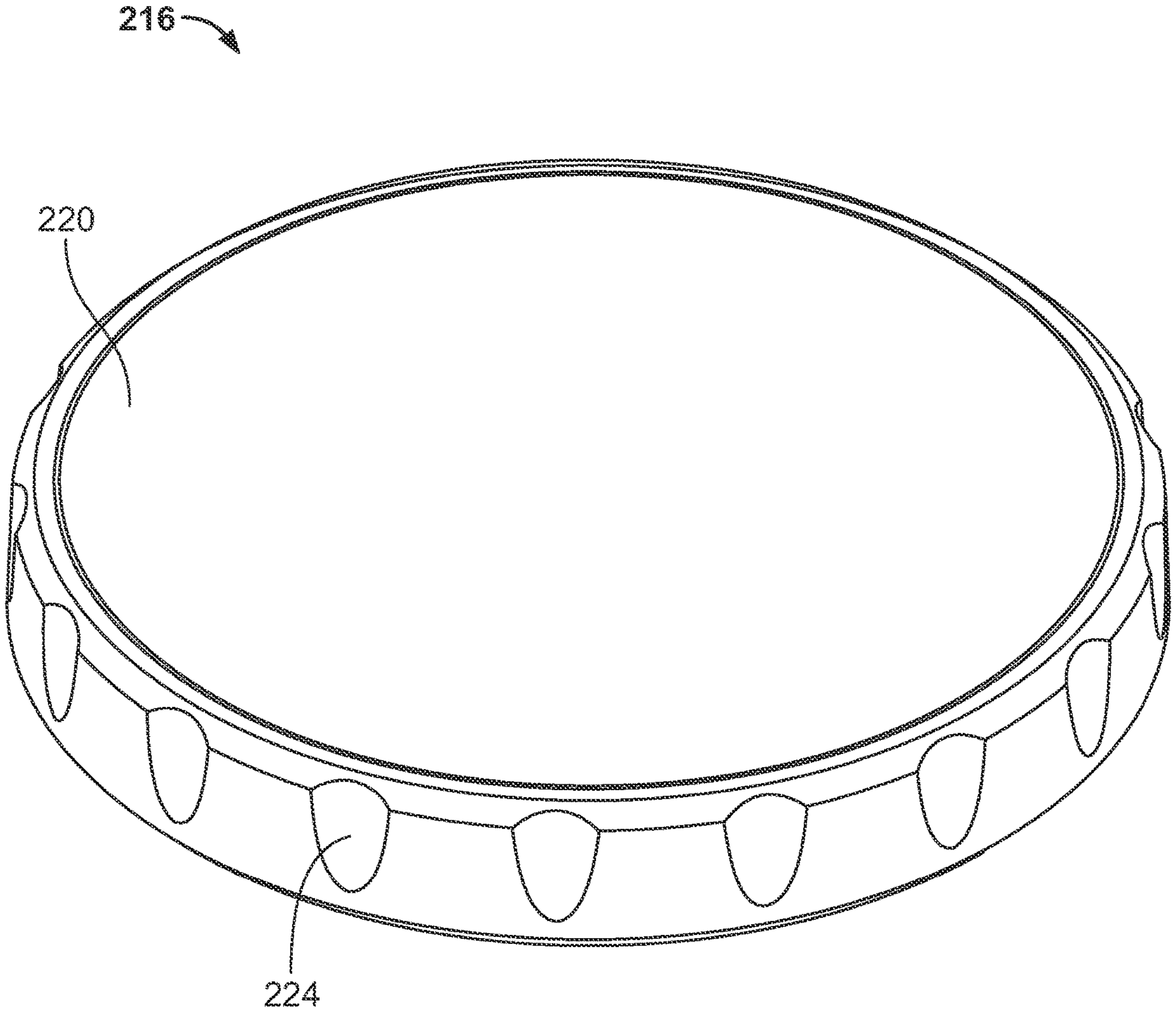
FIG. 13 is an example magnetic accessory according to aspects of the present disclosure.

A lighting device can also be provided with connection structures or features (i.e., a connection interface), that can allow the lighting device to be mounted to a support structure or support surface. That is, a lighting device can be configured to physically (e.g., via fasteners, clips, and brackets) or magnetically couple to a support structure or surface (e.g., a light bar, a charging dock, a panel of a vehicle, and a hard hat) In some cases, a lighting device may include an accessory that acts as an intermediary to allow the lighting device to couple to a structure in a beneficial way. For example, some non-limiting examples of accessories include a headbands, adjustable straps, lanyards, tilting mounts, inserts for traffic cones, auxiliary battery packs, and clips In particular, the example safety light 100 includes a magnet 212 to allow the safety light 100 to be attached directly to a magnetic support structure, or to a non-magnetic structure via an accessory that can couple to the safety light 100 (e.g., a magnetic accessory that can magnetically couple to the safety light 100). As illustrated in FIG. 13, an example accessory 216 is configured as a generally cylindrical puck having an accessory housing 220 that encloses a second magnet (not shown). The accessory 216 can also provide a plurality of indentations 224 (e.g., circumferential indentations, or other similar features or textures), which may aid a user in manipulating the accessory 216. That is, such features can aid a user in removing and attaching the accessory to the safety light 100.

When the safety light 100 is coupled with (i.e., magnetically coupled with) the accessory 216, an article (i.e., object) can be disposed between the accessory 216 and the safety light 100 (e.g., the magnet 212) to attach the safety light 100 to said article. For example, a user's clothing item (e.g., a jacket, a shirt, pants, a belt, or headwear) may be disposed between the mounting plate and the magnet 212, wherein the magnet 212 is coupled to the mounting plate through the user's clothing item, thereby releasably attaching the safety light 100 to the user's clothing. Some non-limiting examples of articles include clothing, helmets, backpacks, belts, tents, windows, boats (e.g., boat siding), containers, road signs, and combinations thereof. In that regard, an accessory can be configured differently, for example, as a clip, a strap, mounting plates and/or brackets, etc. In that regard, a non-limiting example of a mounting plate is the mounting plate disclosed in U.S. Pat. No. 9,478,108, the entire disclosure of which is incorporated by reference herein.

Correspondingly, magnets that can provide strong magnetic coupling are preferable to allow the safety light 100 to be mounted securely to a wider variety of articles. For example, a magnet can be made of a strong magnetic material, such as a rare earth magnet (e.g., a Neodymium or a Samarium Cobalt magnet). Relatedly, multiple magnets may be arranged to provide an enhanced (i.e., stronger) magnetic connection. In particular, magnets can be arranged as a Halbach array, which can provide a strong magnetic field on one side and a weak field on the other. Accordingly, a stronger magnetic coupling can be provided while minimizing any potential magnetic interference with, for example, electrical components of a lighting assembly or wireless communications.

A magnet or other connection structures can be secured to a housing of a lighting device. In particular, such connection structures can be disposed on an exterior of a housing or within a housing. More specifically, a magnet can be secured within a housing, for example, via a press or interference fit connection, fasteners, brackets, and/or adhesives. As illustrated, with continued reference to FIGS. 1-12, the magnet 212 can be secured within the second cap 124 with an adhesive strip (i.e., tape, not shown) disposed between the magnet 212 and the second cap 124. More specifically, the second cap 124 defines a projection 228 extending outwardly therefrom (e.g., in a direction moving from the first side 116A to the second side 116B of housing 104, and thus away from both the first cap 120 and the lens 128). The projection 228 is hollowed out along an interior side of the second cap 124 (e.g., a side closest to the interior space 112) to form a secondary recess 232 that is in communication with the second cap recess 168.

The projection 228 (e.g., the secondary recess 232) is configured to receive the magnet 212 therein, such that the magnet 212 is secured within the housing 104 (i.e., the magnet 212 is not exposed on an exterior of the housing 104). In that regard, the projection 228 and the secondary recess 232 each have a cylindrical shape that corresponds with the cylindrical shape of the magnet 212. Additionally, in this way, the magnet 212 can be fully sealed between the second cap 124 and the second gasket 160. In other embodiments, other shapes of magnets are possible, for example, regular and irregular polyhedrons, non-polyhedrons such as rings, and other amorphous shapes. Relatedly, the size and number of magnets can also be varied, such as to have one, two, three, four, or more than four magnets. Additionally, in other embodiments, a magnet, or at least a portion thereof, can be exposed such that it is positioned outside of a housing.

Figure 14:
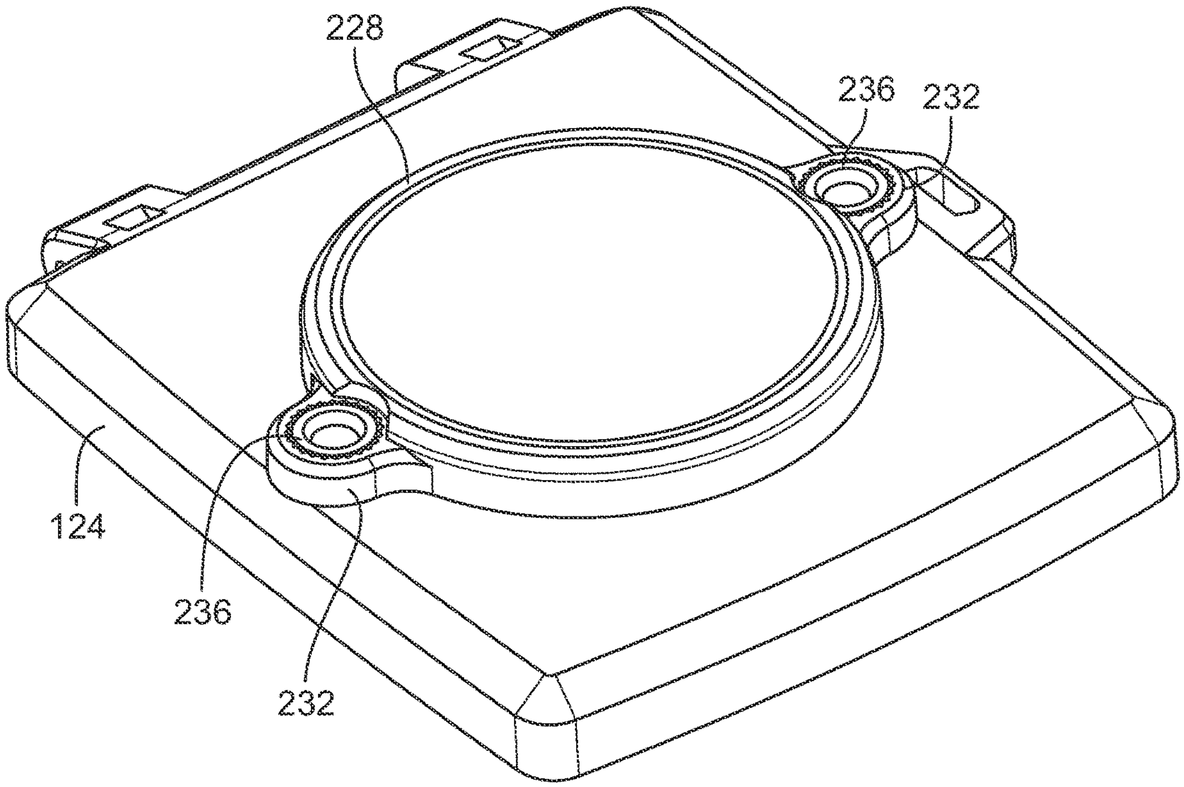
FIG. 14 is an isometric view of a bottom cap of the safety light of FIG. 1.
Figure 15:
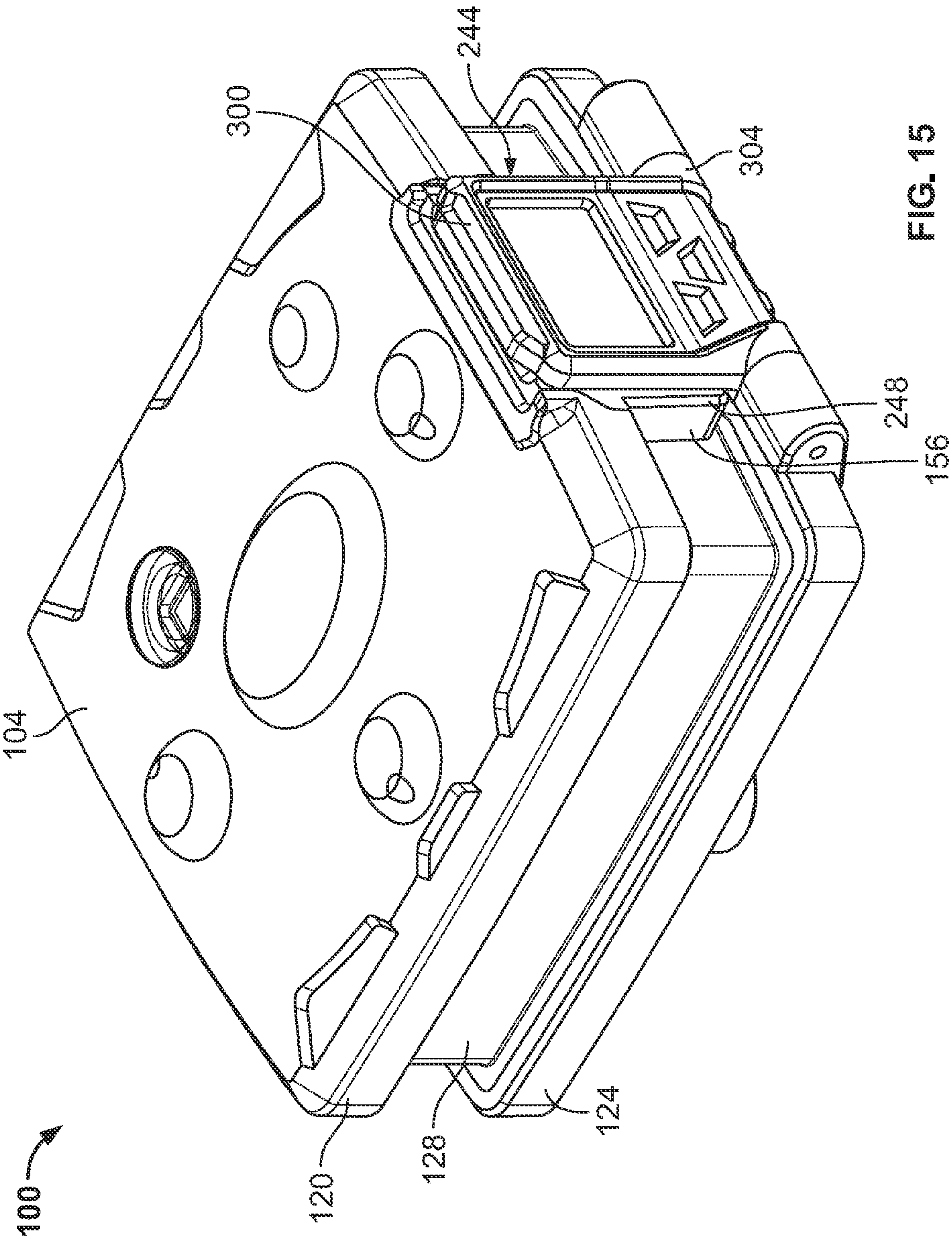
FIG. 15 is a front left perspective view of the safety light of FIG. 1, showing a cover of a port in a closed configuration.
Figure 16:
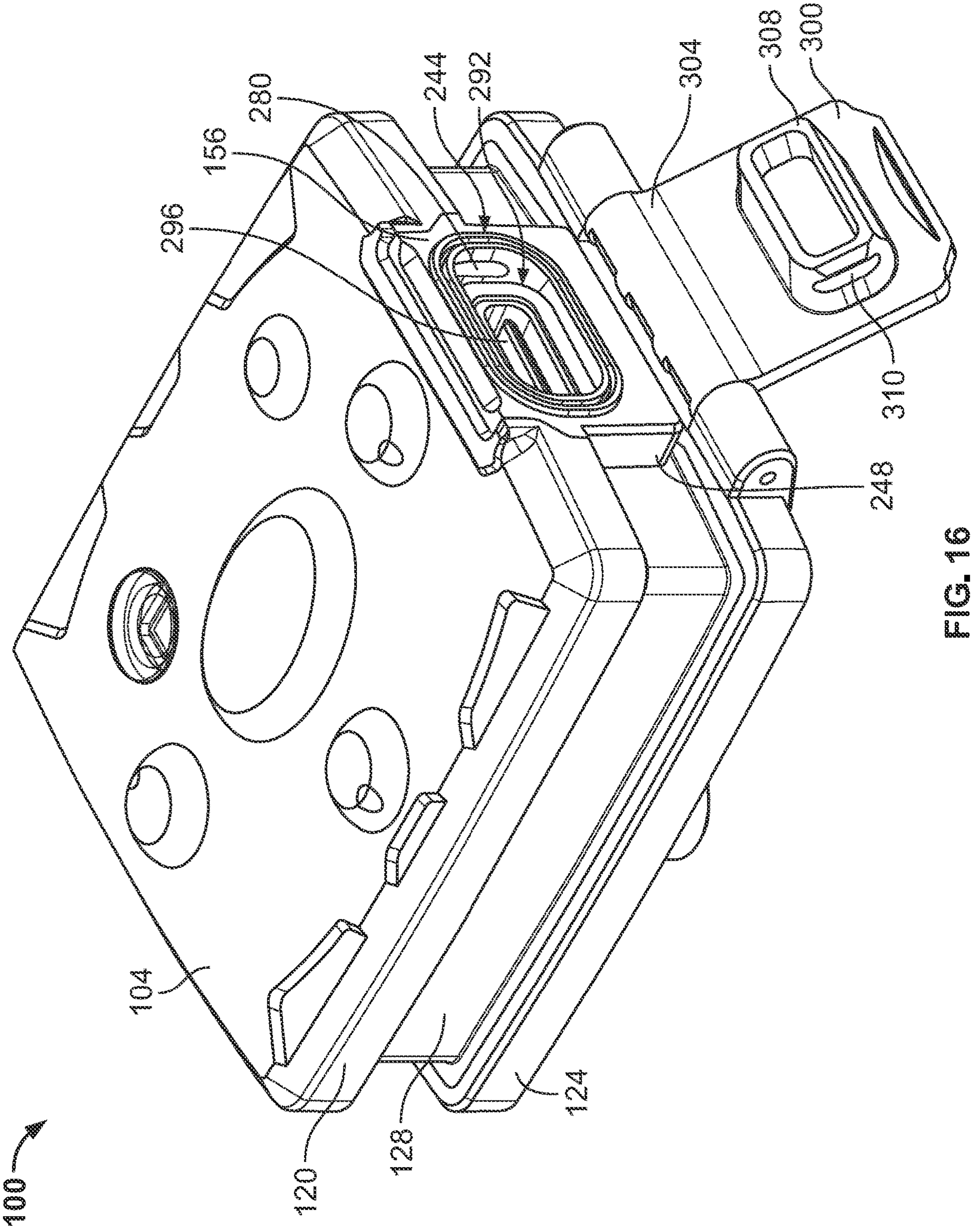
FIG. 16 is a front left perspective view of the safety light of FIG. 1, showing the cover of the port in an open configuration.
Figure 17:
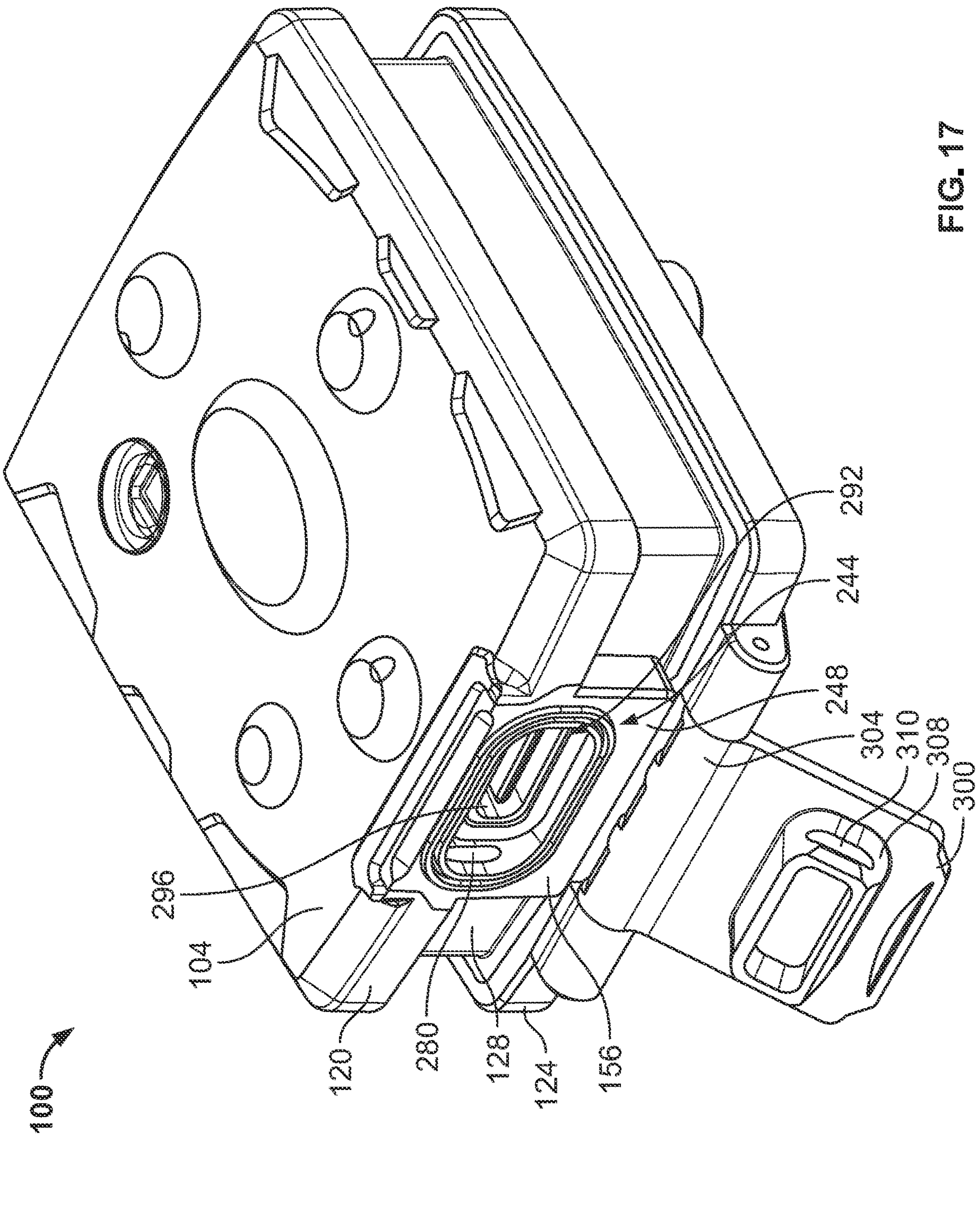
FIG. 17 is a front right perspective view of the safety light of FIG. 1, showing the cover of the port in an open configuration.
Figure 18:
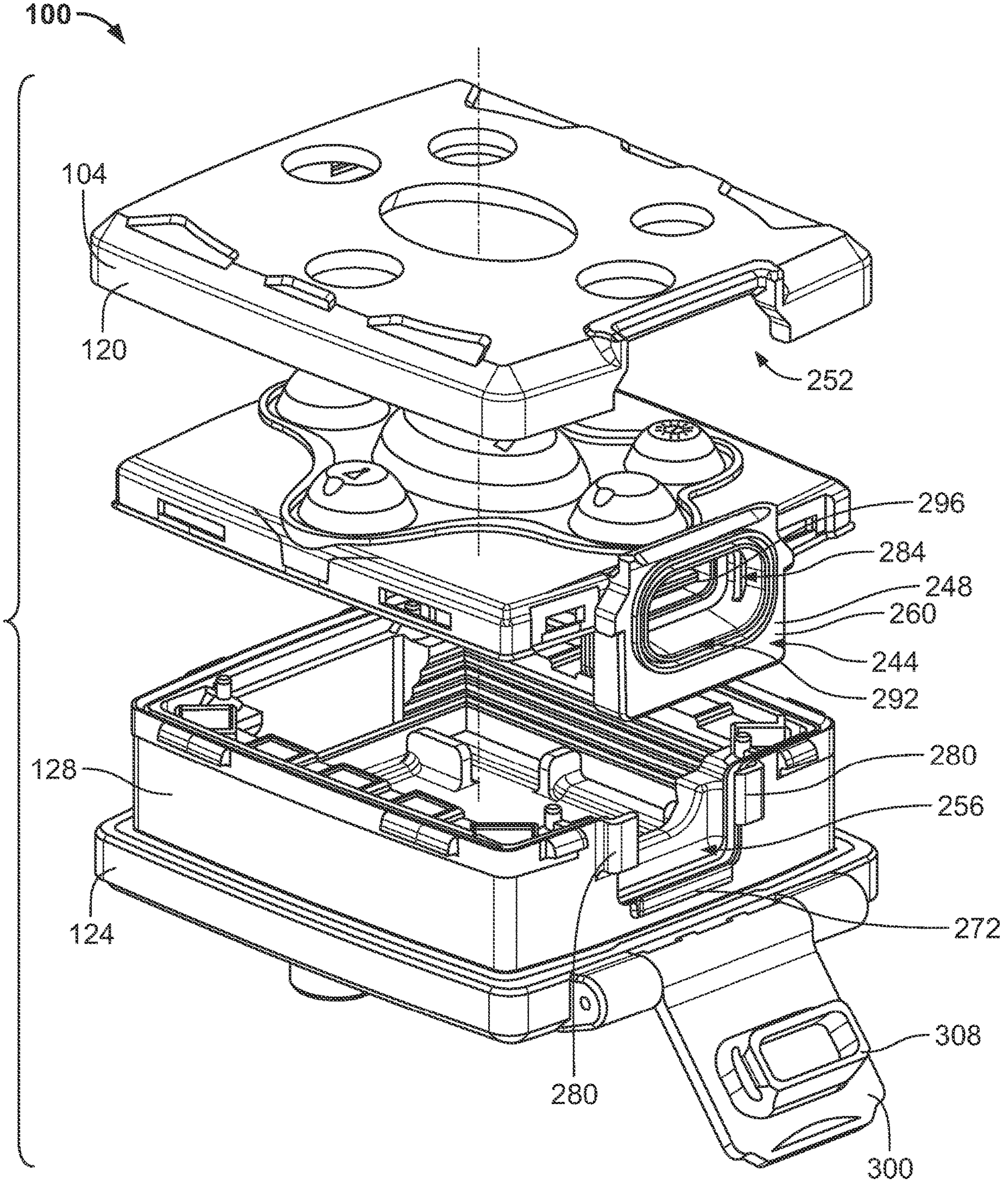
FIG. 18 is an exploded view of the port of the safety light of FIG. 1.
Figure 19:
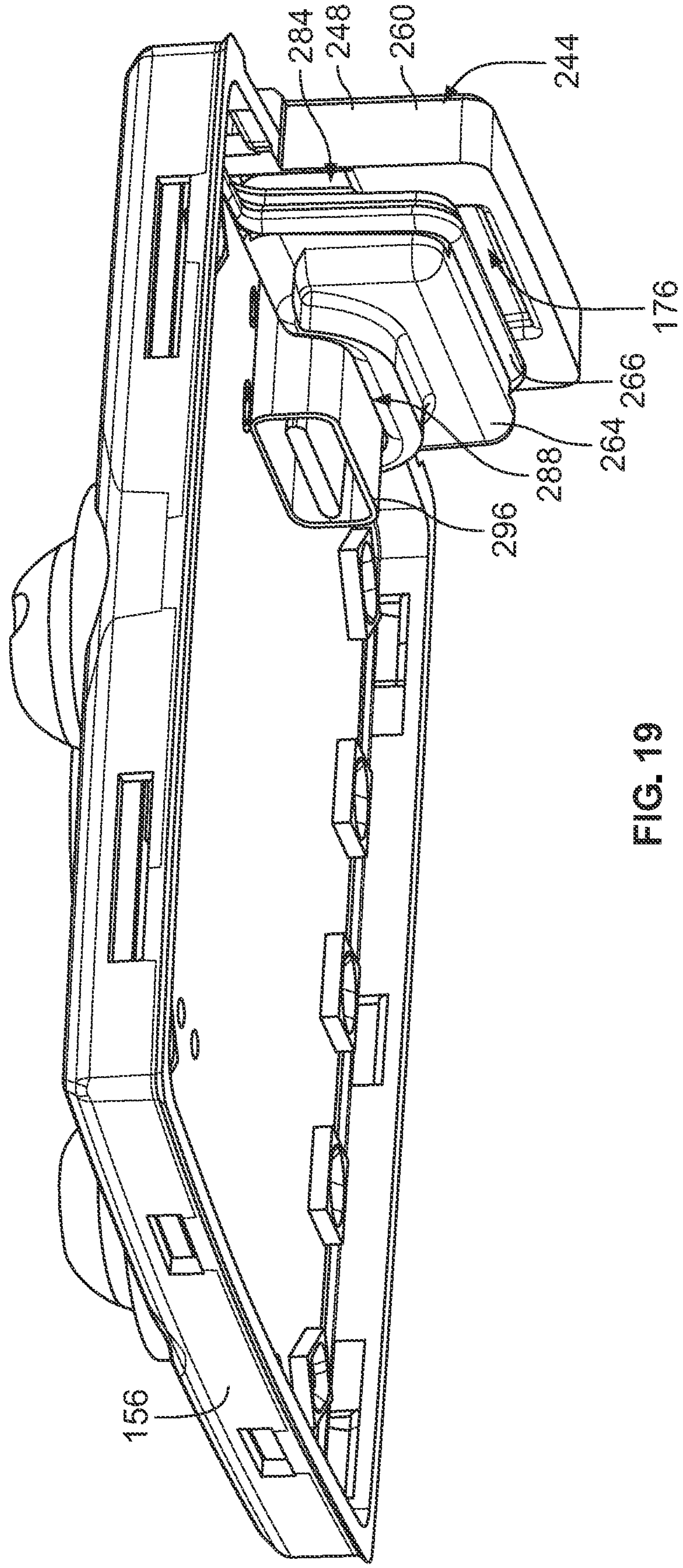
FIG. 19 is a front right perspective view showing a port body of the safety light of FIG. 1.
Figure 20:
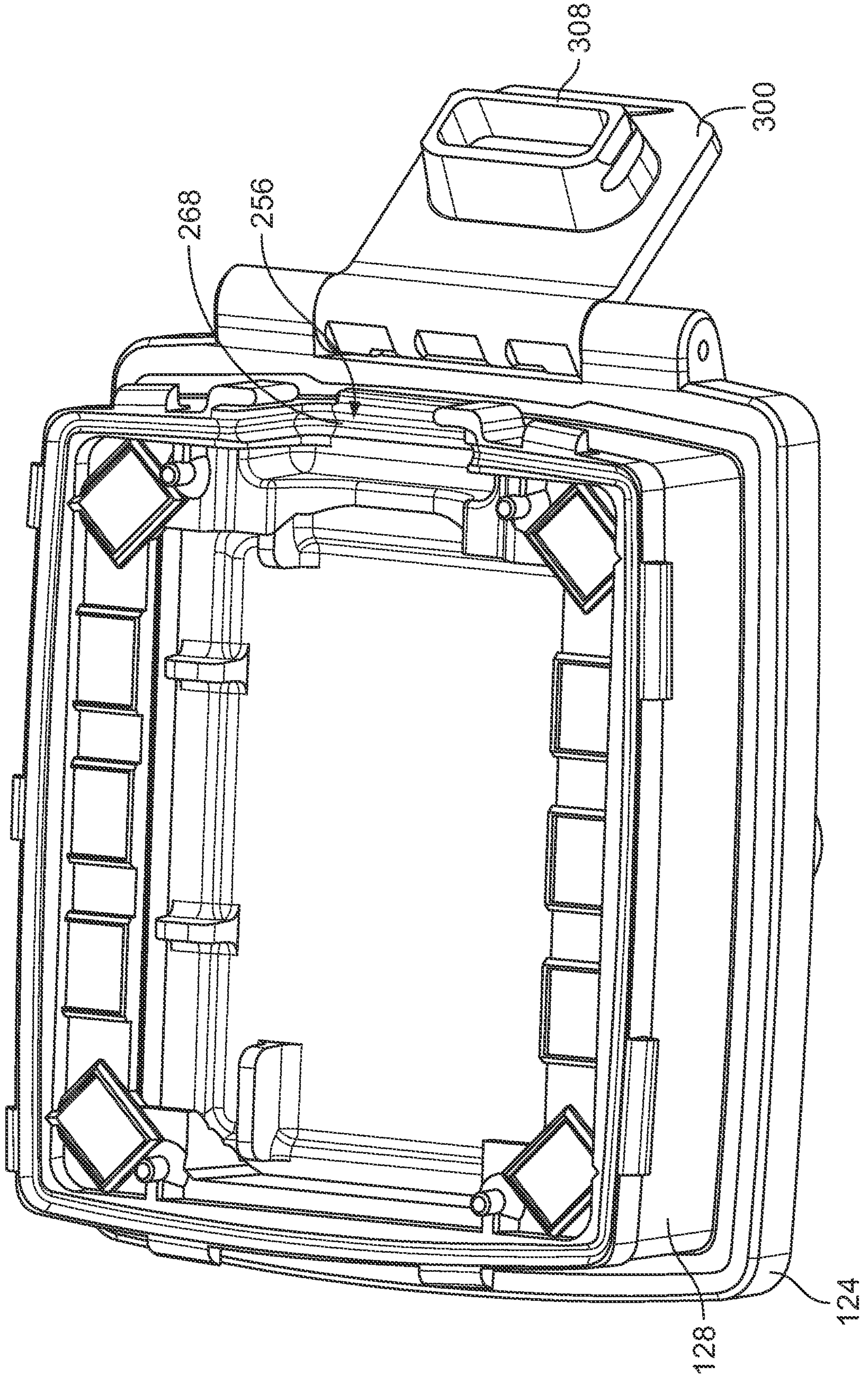
FIG. 20 is a top perspective view of the safety light of FIG. 1 with a top cap and top gasket removed to show a recessed cutout in a lens.

In some embodiments, a housing of a lighting device can further include other types of connection structures. That is, a housing can be further configured to provide structural or electrical connections with external structures (e.g., external devices). In some cases, such connection structures can serve as locating or orientating features configured to allow the lighting device to couple with another object in a specific way. For example, with additional reference to FIG. 14, the second cap 124 can include one or more ears 236, and in this case a pair of ears, extending from the projection 228. The ears 236 can be configured to provide connection points to allow safety light 100 to couple to other structures. In particular, each of the ears 236 of the present embodiment includes a threaded insert 240 that can receive a fastener (not shown), thereby allowing the safety light 100 to be fastened to, for example, a support structure, device, or accessory. In that regard, the threaded inserts 240 can be made from a durable material, for example, metal (e.g., brass or steel). In other embodiments, the ears 236 can also be configured to provide an electrical connection, such as for charging or communication. For example, the ears 236 can include pins or other structures configured as electrical terminals. In that regard, the threaded inserts 240 can also be configured to function as electrical terminals that allow, for example, charging of a power source of a lighting assembly 108 or communications between a lighting assembly and an external device. Relatedly, the ears 236 may also be configured to orient the safety device relative to a connected structure, accessory, or device.

In some embodiments, a housing of a lighting device can include one or more access ports. Access ports can be configured to be opened by a user to access components that may be generally within a housing. Such access ports can be configured as tool-less access ports that can be operated by a user without the need for tools (e.g., a screwdriver), or they can require tools to open (e.g., an access port that is closed with fasteners). Access ports can be provided for specific functions, such as facilitating charging or data transfer, or for storage or access internal components of a lighting device. In particular, a housing can include a charging and/or communication port, that can allow a corresponding cable to be connected to the lighting device. Relatedly, a housing can be configured to provide for one or more access ports, for example by providing a path through the housing, and such access ports can be configured to prevent or reduce the ingress of contaminants. For example, in the illustrated embodiment and referring to FIGS. 15-20, the housing 104 defines an access port configured as a combination communication and charging port 244. The port 244 is configured to provide power to the lighting assembly 108 (e.g., to a power source of a lighting assembly, such as a battery), as well as allowing communication with the lighting assembly 108, for example, to upload firmware or software, or to control one or more functions of the lighting assembly 108. In that regard, a cable (not shown) can serve as a connection (e.g., a data or power connection) between the safety light 100 and an external device, such a charger, computer, or a vehicle.

As illustrated, the port 244 is generally defined by a port body 248 extending from the first gasket 156. More specifically, the port body 248 is cantilevered from the first gasket 156 so as to extend generally toward the second cap 124. The port body 248 is configured to extend between the interior space 112 of the housing 104 and the exterior of the housing 104 to provide a path that allows the lighting assembly 108 to connect with an external device. Correspondingly, the port body 248 can be secured between the first cap 120 and the lens 128. That is, the first cap 120 and the lens 128 can be configured to engage the port body 248. For example, the first cap 120 can include a first or cap cutout 252 (see FIG. 18) and the lens 128 can include second, recessed cutout 256 (e.g., a cupped portion with a cutout, see FIGS. 18 and 20) that are configured to cooperate with one another to secure the port body 248 and to locate (i.e., position) the port body 248 relative to the housing 104. More specifically, the cap cutout 252 is configured to engage an exterior flange 260 (e.g., a notched outer flange) of the port body 248, which extends (e.g., radially or circumferentially) from a base 264. Here, the exterior flange 260 completely surrounds the base 264, but this may not always be the case and the exterior flange 260 may only partially surround the base 264 or there may be no flange at all.

Additionally, the recessed cutout 256 of the lens 128 is configured to receive and retain the base 264. In that regard, the recessed cutout 256 and the base 264 can be configured to engage one another to position the base 264 (i.e., the port body 248) relative to the rest of the housing 104. For example, in the illustrated embodiment, the base 264 of the port body 248 defines a peripheral ridge 266, which can be received in a corresponding groove 268 defined by the recessed cutout 256. Additionally, or alternatively, the lens 128 can further include a projection that can engage (i.e., be received by) a corresponding groove or slot formed in the port body. For example, in the illustrated embodiment, the lens 128 includes a shelf or ledge 272 (e.g., an elongate shelf or ledge) that is received within a correspondingly shaped pocket 276 formed in the exterior flange 260. Moreover, the lens 128 further includes arms 280 (i.e., a pair of opposing arms) that are each received within corresponding holes 284 formed in the port body 248. In other embodiments, the port 244 (e.g., the port body 248 and the corresponding connections with the housing 104) can be configured differently, such as to extend out of only the first cap 120, the second cap 124, or the lens 128. In that regard, a port can be provided on any side or combination of sides of a safety light, or other lighting device.

Continuing, to provide a path between the interior space 112 and the exterior of the housing 104, the port body 248 generally includes a port opening that is configured to receive a connection terminal (e.g., a connection terminal of the safety light 100). As illustrated, a port opening 288 is disposed within a port recess 292 defined by the exterior flange 260 and the base 264. The port opening 288 can be shaped to sealingly engage around a connection terminal 296. Various types of standard connection terminals (e.g., USB, ethernet, OBD II, or barrel connectors) and/or other proprietary connection terminals can be used. As illustrated, the connection terminal 296 is configured as a USB type C (USB-C) connection terminal, and more specifically, a female USB-C connection terminal. Correspondingly, the connection terminal 296 can be a male or female connection terminal.

In other embodiments, more or fewer ports can be provided, for example, there may be 1, 2, or more than 3 ports, or no ports at all. Where multiple ports are included, each port can be configured to provide different functions. For example, a port can include a connection that is configured to couple to a charging cable, while another port can be used to couple with a communication cable. Additionally, a single port can be provided with multiple terminals to provide for different types of connections and functions (e.g., a barrel connector for charging and a USB or ethernet terminal for communication). Relatedly, a port can facilitate communications based on known communications standards (e.g., CAN networks for automobiles or other power equipment and machines). Additionally, or alternatively, a lighting device can be configured to provide similar connections wirelessly. In particular, a lighting device can be configured to wirelessly communicate with one or more external devices, and to wirelessly transfer (electrical) power (e.g., to receive power to charge a power source of the safety light or to provide power to charge an external device). In particular, a lighting device can be configured to communicate with vehicles, namely, autonomous or semi-autonomous vehicles, for example, to communicate a location of the safety light or to send another type of signal (e.g., a warning signal).

An access port can include a cover or door that is configured to protect the access port. In that regard, a cover can also open and close the access port. In particular, a lighting device can include a cover that is configured to cover an access port. That is, a cover can be configured to selectively engage with a port to close the port and prevent contaminants from entering the port. In that regard, user can manipulate a cover to open and close an access port as needed. The cover can be retained in one or both of an open and a closed configuration. In some cases, a cover can be configured to automatically move to a closed configuration. For example, with reference to FIGS. 15-18 and 20, safety light 100 includes a cover 300 that can be manipulated by a user to open and close the port 244. That is, the cover 300 is configured to be moved by a user between an open configuration (see FIGS. 16 and 17), wherein the cover 300 is not engaged (i.e., disposed or moved away from) the port body 248, and a closed or sealed configuration (see FIG. 15), wherein the cover 300 is engaged (e.g., sealingly engaged) with the port body 248. As illustrated, the cover 300 can be rotatably coupled with housing 104, and more specifically, rotatably coupled with the second cap 124, to move between the open configuration and the closed configuration. In particular, the cover 300 is coupled with the second cap 124 at hinged connection 304. The hinged connection 304 can be at least partially integrally formed with the housing 104 and the cover 300, or it can be a separate component that is coupled between the cover 300 and the housing 104. The hinged connection may have a tolerance that allows non-rotational movement of the cover 300 about the hinged connection to allow the cover 300 to align with the port body 248. In other embodiments, a cover can be coupled to a housing in other ways, for example, being connected with a flexible tether.

In some embodiments, a cover can be configured to be retained in a closed configuration. That is, a cover and a port can include locking structures that can provide a removable snap-fit connection therebetween. In particular, with particular reference to FIGS. 16 and 17, the cover 300 includes a protuberance 308 (e.g., a tapered protuberance) that is configured to be sealingly received within the port recess 292. That is the protuberance 308 can be sized to be slightly larger than the port recess 292 so that the protuberance 308 sealingly contacts (e.g., so that the protuberance compresses the port body 248) around an inner perimeter of the port recess 292. Such sealing contact can also provide a resistive frictional force that can help to retain the cover 300 in the closed configuration. To provide an even more secure connection, additional locking features can be provided. For example, arms 280 of the lens 128 extend partially into the port recess 292 (e.g., by extending through the holes 284 of the port body 248. Correspondingly, the protuberance 308 defines notches 310 that are configured to engage and receive the arms 280 (e.g., distal tips of the arms 280) to provide a releasable snap-fit connection therebetween. In some embodiments, the cover 300 can be made of a resilient polymer or rubber compound to provide a small amount of compression so that the cover can snapably engage the comparatively hard and inflexible material of the lens 128.

Figure 21:
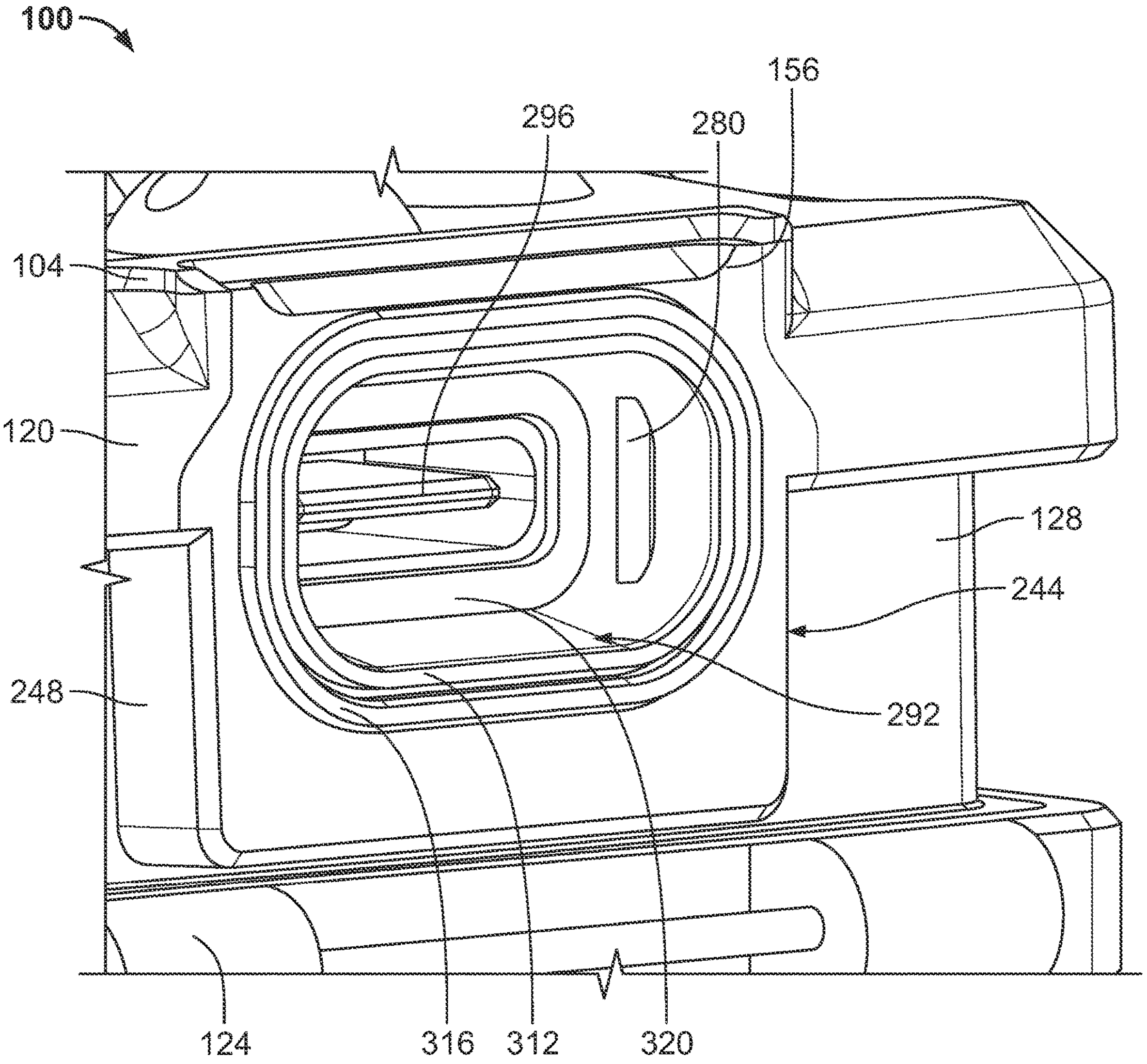
FIG. 21 is a partial perspective view of the port of the safety light of FIG. 1.

Relatedly, as mentioned above, a cover can be configured to seal against a port to prevent the ingress of contaminants into the port. Turning to FIG. 21, the port body 248 can include a plurality of sealing elements and/or surfaces that can be configured to provide a seal between the cover 300 and the port body 248. In particular, the exterior flange 260 of the port body 248 includes a first or inner sealing protrusion defining a first seal 312 and a second or outer sealing protrusion defining a second seal 316. Each of the first seal 312 and the second seal 316 are configured to surround an outer periphery of the port recess 292, the first seal being disposed between the port recess 292 and the second seal 316. The first seal 312 and the second seal 316 are configured to be compressed by the cover 300 in the closed configuration, thereby creating respective seals between the cover 300 and the port body 248. Additionally, the port recess 292 defines an inner surface (e.g., a lower or bottom surface of the port recess) that defines a third seal 320. The third seal 320 engages a distal end of the protuberance 308 to provide a seal between the cover 300 and the port body 248. Relatedly, the third seal 320 may similarly provide a seal when a cable is connected to the connection terminal 296. Each of the first seal 312, the second seal 216, and the third seal 320 can be configured to provide a full or three hundred sixty degree seal.

Additionally, a cover can be configured to engage with one or more external devices, for example, as may provide additional capabilities or functions to a safety light. By providing a connection at a cover, the strength of a connection between a safety light can be improved to help reduce the possibility of the cable from inadvertently disengaging from a connection terminal, as compared with providing a connection via just a USB port or other type of connection terminal. In some cases, an external device can be an environmental sensor configured to detect one or more parameters of a surrounding environment, as may allow a safety light to be operated in accordance with the one or more sensed parameters. For example, environmental sensors can include sensors for heat, smoke, ambient light, motion, sound, etc. In some cases, an external device can be configured provide additional functions to a safety light. For example, an external device can be configured as a camera module, a microphone module, a GPS module, etc. In some cases, an external device can be another safety light, for example, as may allow multiple safety lights to be daisy-chained together (e.g., for use as a light bar for a vehicle).

Figure 22:
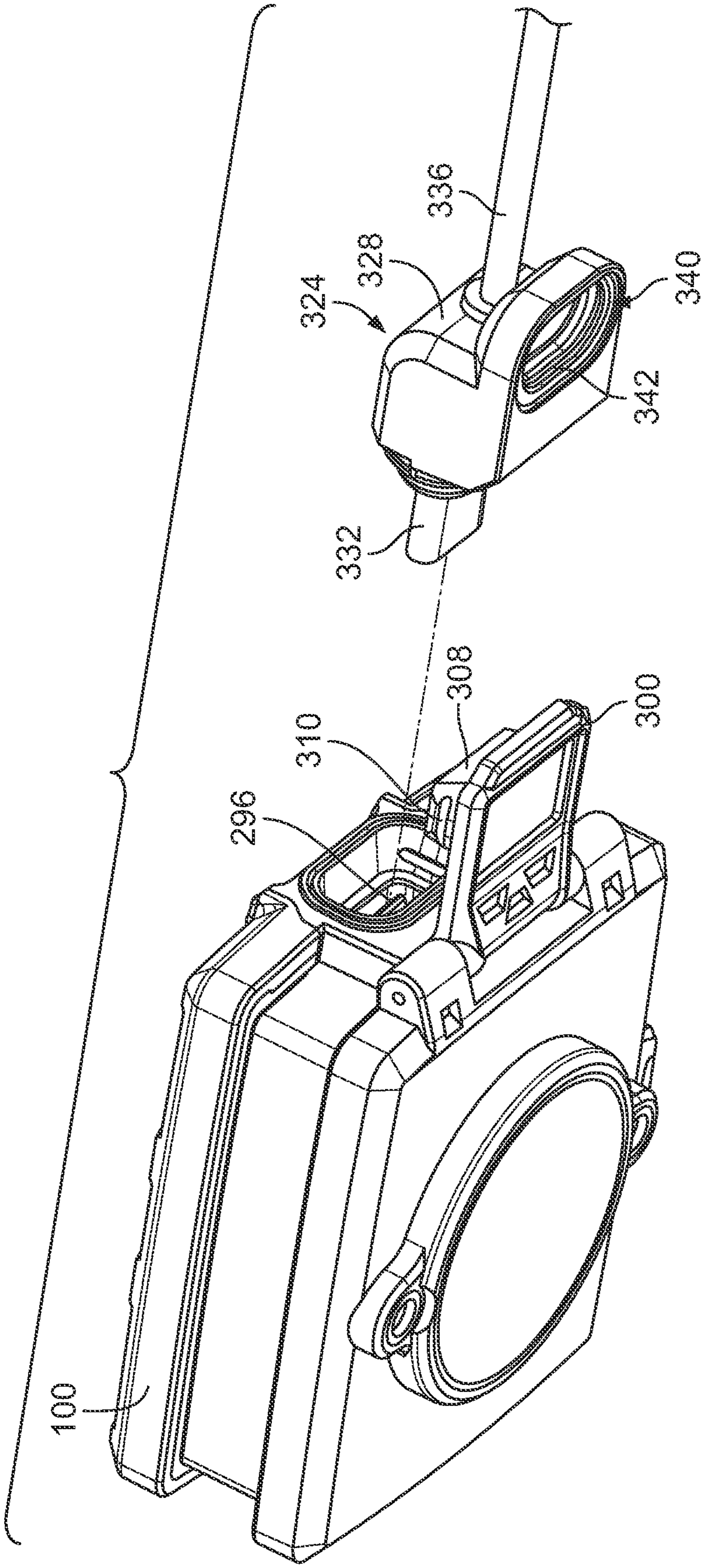
FIG. 22 is a perspective view of the safety light of FIG. 1 and an exemplary cable, according to aspects of the disclosure, with the cable in an unconnected configuration.
Figure 23:
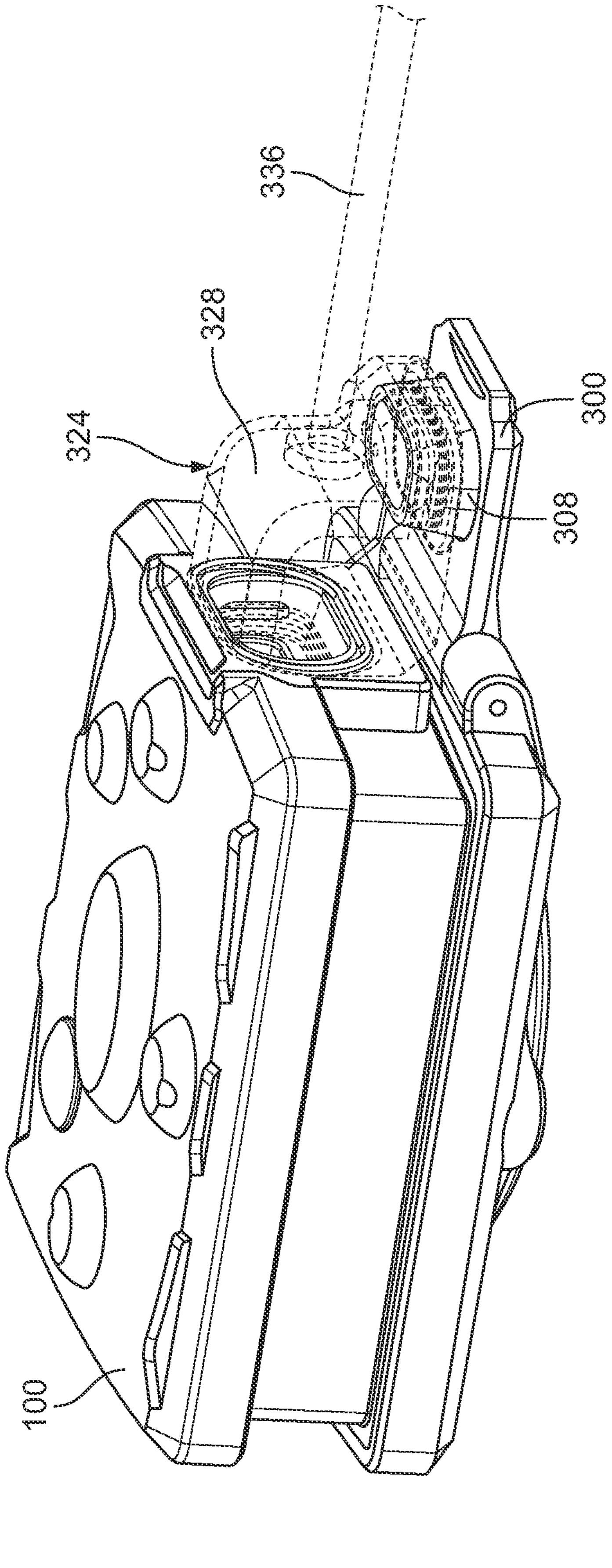
FIG. 23 is a perspective view of the safety light and the cable of FIG. 22, with the cable in a connected configuration.

In some cases, a cover can be configured to engage with a cable of an external device, which may provide a more flexible connection therebetween, as may further reduce the possibility of the external device from inadvertently disengaging from the connection terminal. Such arrangements may be particularly beneficial when an external device is connected to a lighting device during use, for example, when the safety light is coupled to an external charging device (e.g., a solar charging module or auxiliary battery pack) for increased operating time. For example, a portion of a cable, such as a strain relief, can be configured to couple with a cover and a port. In particular, with reference to FIGS. 22 and 23, an exemplary cable 324 can generally include a strain relief 328 that can increase the durability of the cable 324. The strain relief 328 can disposed between a cable terminal 332, which is configured to engage with the connection terminal 296 of the safety light 100, and a wire 336 extending outward and in an opposite direction from the cable terminal 332 (e.g., so that the cable terminal 332 and the wire 336 are in line with one another). The strain relief 328 can define a depression 340 that can be configured to receive the protuberance 308 of the cover 300. Accordingly, the depression 340 can sometimes include internal ridges or protrusions 342 that are configured to engage with the notches 310 of the protuberance 308, to provide a stronger connection. Accordingly, after plugging the cable 324 in (e.g., connecting the cable terminal 332 with the connection terminal 296), as illustrated in FIG. 23, a user can rotate the cover 300 toward (i.e., in the direction of) the closed configuration to insert the protuberance 308 into engagement with the depression 340 in the strain relief 328. Thus, the cover 300 can provide an opposing force to resist movement of the cable 324 away from the connection terminal 296 (i.e., the safety light 100), which could cause the cable 324 to undesirably disconnect.

Figure 24:
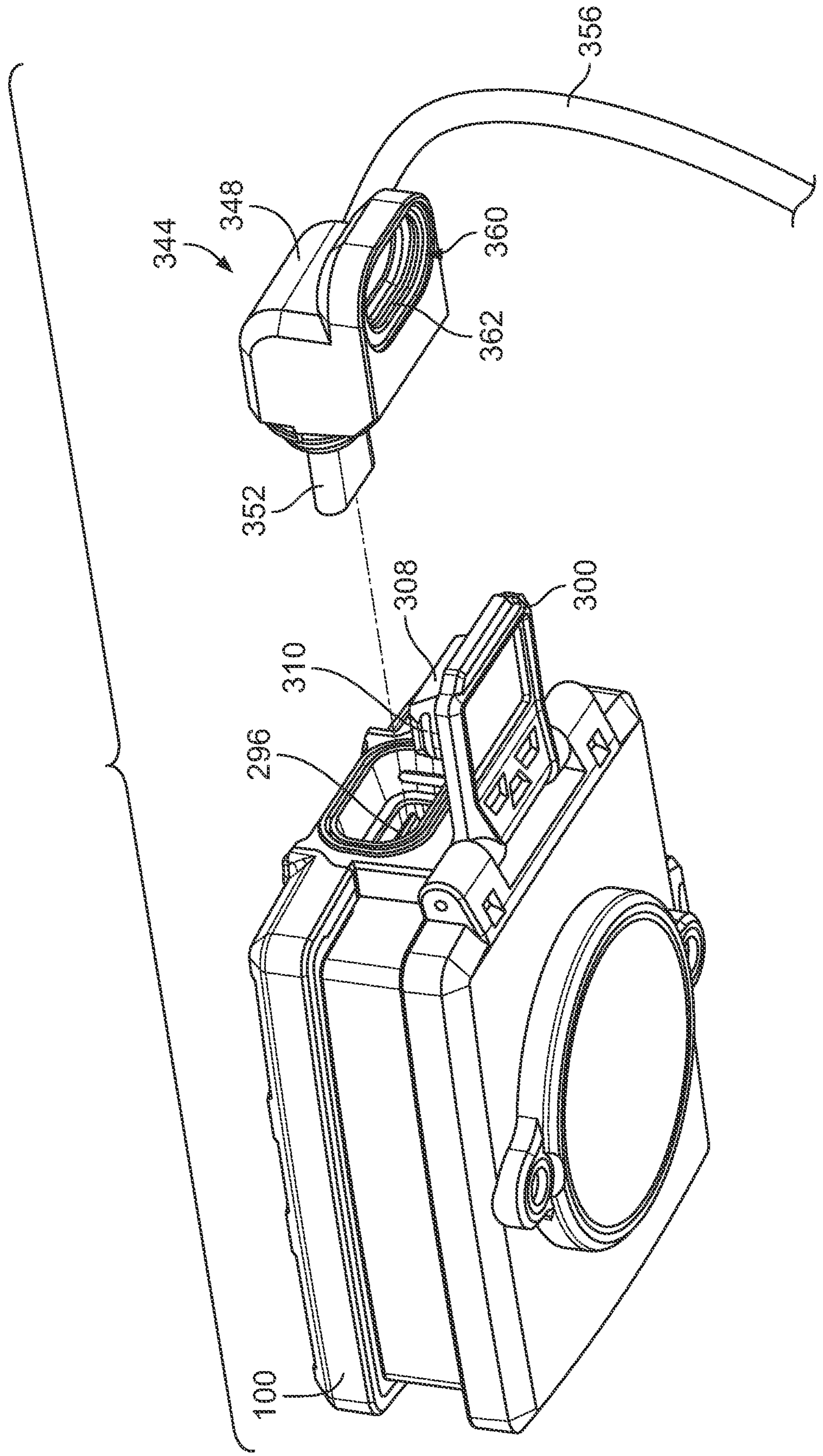
FIG. 24 is a perspective view of the safety light of FIG. 1 and another exemplary cable, according to aspects of the disclosure, with the cable in an unconnected configuration.
Figure 25:
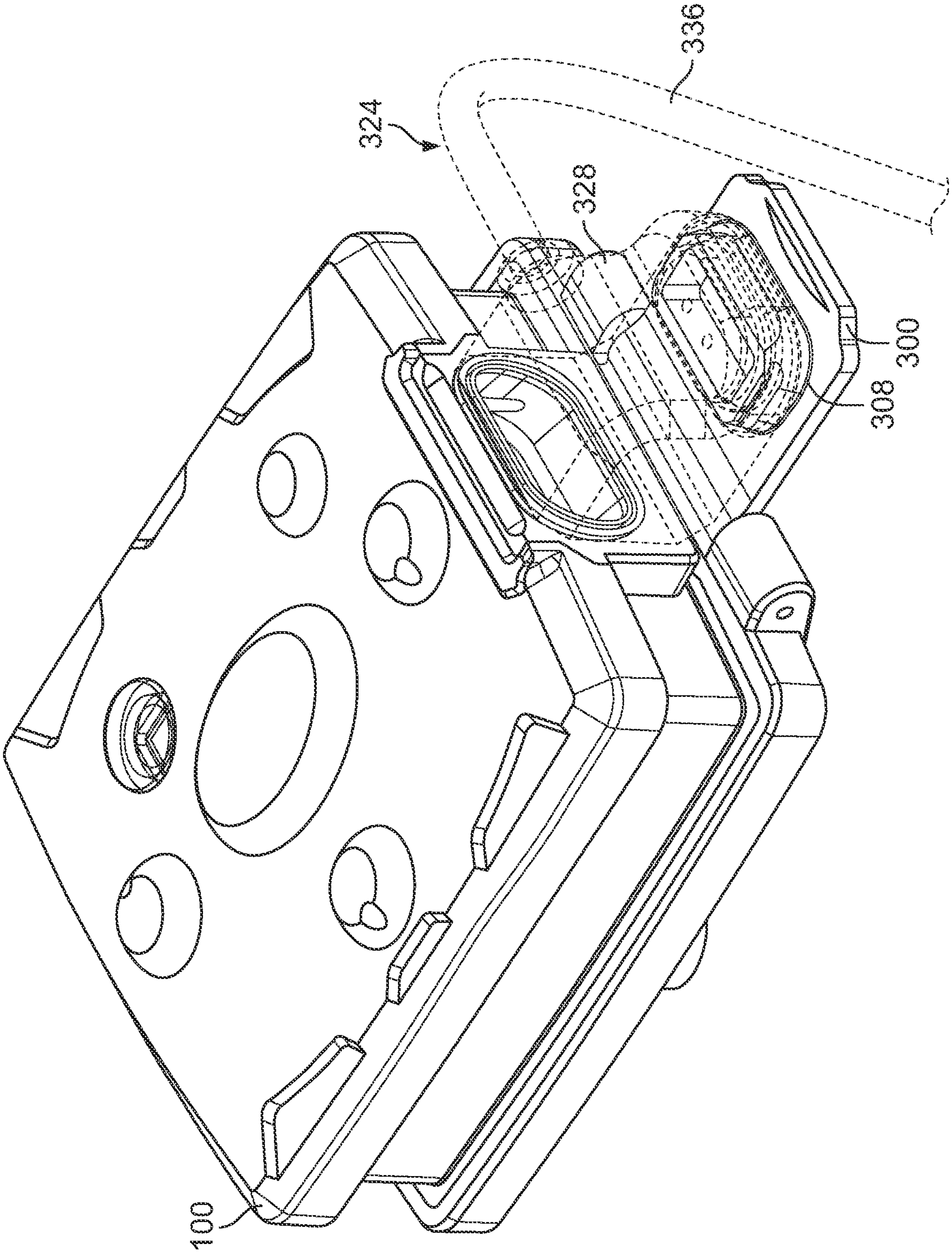
FIG. 25 is a perspective view of the safety light and the cable of FIG. 24, with the cable in a connected configuration.

In other embodiments, a cable can be configured differently. For example, FIGS. 24 and 25 show another exemplary cable 344. The cable 334 is generally similar to the cable 324, in that it includes a strain relief 348 disposed between a cable terminal 352, and a wire 356. Likewise, the strain relief 348 defines a depression 360 with internal ridges or protrusions that can be configured to receive the protuberance 308 of the cover 300 to provide an opposing force to resist movement of the cable 344 away from the connection terminal 296 (i.e., the safety light 100). However, here, the cable 344 is configured so the cable terminal 352 and the wire 356 are not in-line with one another. That is, the wire 356 exits the strain relief 348 such that the wire 356 is approximately perpendicular to the cable terminal 352. In other embodiments, the wire 356 may exit the strain relief 348 at a different angle relative to the cable terminal 352. Relatedly, the angle between the strain relief 348 and the cable terminal 352 may be adjustable. Moreover, in yet other embodiments, a depression to lock a cable to a safety light or other lighting device can be configured in other ways. For example, a depression or multiple depressions with differing sizes and shapes can be provided on a dongle that is slidably or fixedly connected to a wire of a cable. Such configurations can be useful to allow a cable to couple to a variety of devices, which may be configured differently from one another.

Continuing, and as mentioned above, a lighting device generally includes a lens that is configured to direct and control the output of light from a lighting assembly. That is, a lens can be tailored to provide a desired output of light, for example, by controlling the refraction of light passing through the lens. In that regard, a lens can be configured direct and control light from a light source (e.g., lighting elements of a lighting assembly) to produce, for example, a single beam or multiple beams of light (e.g., columnated, high-intensity light) that can be observed over long distances (e.g., up to a mile, or greater than five miles, or anywhere therebetween), or to create a comparatively diffuse or low-intensity light for indoor use, or for use as a work light. The amount of diffusion and columniation of the light can be tailored for specific applications. In addition to refracting light, a lens can also be configured to reflect light within the lens, for example, by adding a reflective coating or angling a surface of the lens to cause total internal reflection of the light. In the regard, a lens can include one or more waveguides to guide light along a desired path through the lens to be emitted from the lens. In some cases, a waveguide can be configured as a prism, which can direct light in a transverse direction. More specifically, light can be directed via total internal reflection and/or or by a reflective coating. Correspondingly, the material, and thus the material properties, of the lens can be selected to refract (i.e., bend), or reflect incoming light in the manner required by a specific application. For example, a lens can have angle of 45 degrees relative to a direction of travel of incoming light so as to direct (i.e., reflect) the light out a lens. In particular, the light exiting the lens can be perpendicular to the light entering the lens. In some cases, reflection of the light in this way can result from total internal reflection of the light within the lens off of a reflecting surface. Alternatively, or additionally, a reflecting surface can include a reflective coating (e.g., a chromed or other mirrored finish) to further improve the reflection of light.

In some cases, a lens can define individual lens elements or waveguides to help achieve a desired output characteristic. That is, a lens can include different sections or structural features that are configured to cooperate with one another to provide a desired output. For example, a lens can include a plurality of lens elements, which can be configured areas of localized curvature (e.g., flat, convex, or concave curvature) or other geometries (e.g., ridges, flutes, etc.), or distinct structures (e.g., separate lenses, prisms, or other structures) configured to operate in conjunction with one another to achieve the desired output, for example, a tinted lens element and a columnating or diffusing lens element. In particular, tinting a lens can provide for an increased color gamut, which may not be possible with lighting elements alone. For example, a lens can have a purple tint to achieve a desired hue with a white light emitting lighting element.

Figure 26:
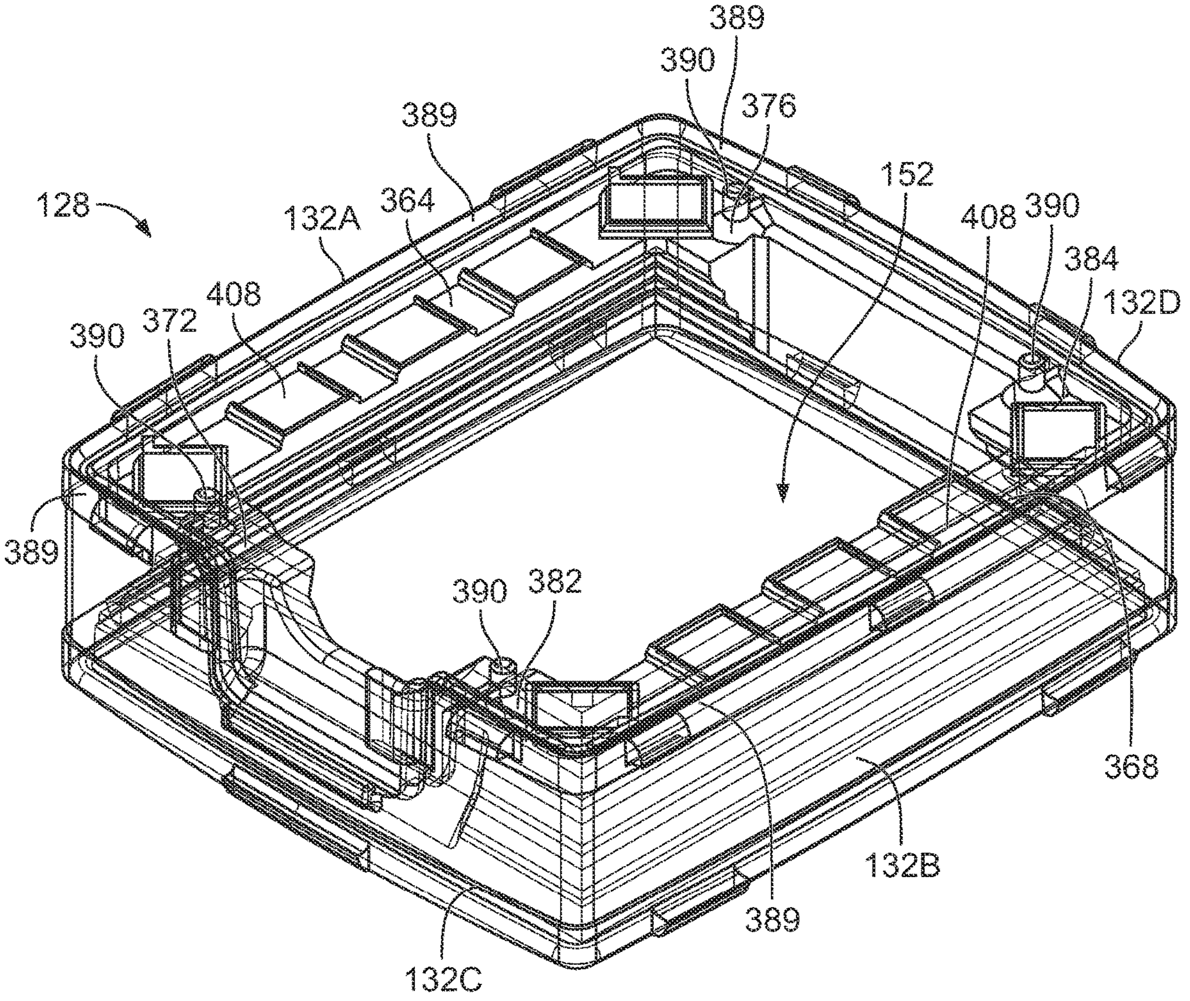
FIG. 26 is a perspective view of a lens of the safety light of FIG. 1.

For example, referring now to FIG. 26, the lens 128 is shown in greater detail. The lens 128 defines a plurality of lens elements, namely, a first lens element 364 and a second lens element 368. Each of the first lens element 364 and the second lens element 368 are configured as U-shaped lens elements or prisms, which are mirror images of one another. More specifically, the first lens element 364 extends along an entire length of the first sidewall 132A and includes a first leg 372 extending partially along the third sidewall 132C and a second leg 376 extending along the fourth sidewall 132D. Similarly, the second lens element 368 extends along an entire length of the second sidewall 132B and includes a third leg 380 extending partially along the third sidewall 132C and a fourth leg 384 extending along the fourth sidewall 132D. In that regard, each of the first lens element 364 and the second lens element 368 only extend along a portion of a periphery of the housing 104. However, given the rectangular periphery of the housing 104 and the specific arrangement of each of the first lens element 364 and the second lens element 368, light passing through the lens 128 can be view from three hundred sixty digress around the safety light 100 (e.g., light is directed around a periphery of the housing 104).

Thus, each of the first lens element 364 and the second lens element 368 are configured to receive light emitted from the lighting assembly 108, and to direct the light out of the lens. More specifically, each of the first lens element 364 and the second lens element 368 are configured as a triangular lens elements (e.g., a lens element having a substantially triangular cross section), which are prisms (i.e., triangular prisms) that can bend or reflect light to direct the light between non-parallel surfaces. Accordingly, with additional reference to FIG. 27 (showing only the first lens element 364), each of the first lens element 364 and the second lens element 368 define first or top surface 388, a second or outer surface 392, and a third or inner (interior) surface 396; however, in other embodiments they can be configured differently to direct light in other ways. The top surface 388 extends generally parallel with and along the first side 140A of the lens 128. The outer surface 392 extends substantially perpendicularly downward from an outermost edge of the top surface 388 to the second side 140B of the lens 128. Accordingly, the outer surface 392 defines an exterior of the lens 128, and thus, a periphery of the housing 104. In this case, the outer surface 392 is slightly convex such that it bows outward, but this may not always be the case (an outer surface can alternatively be flat, concave, ribbed, wavy, etc.). The inner surface 396 extends between an innermost edge of the top surface 388 and a lowest edge of the outer surface 392.

Accordingly, the inner surface 396 is generally angled with respect to the outer surface 392, so as to define an angle 400 therebetween. In some embodiments, an outer surface or an inner surface can be a flat (i.e., planar) surface. However, in some embodiments, an outer surface or an inner surface may not be flat (i.e., to be non-planar). For example, an outer surface or an inner surface can be curved, scalloped, ribbed, or include other types of features configured to bend or reflect light in a desired manner. In such cases, an angle, an outer surface, and an inner surface may be measured with respect to linear regression line of the respective surface. For example, in the present embodiment, the outer surface 392 is substantially flat, while the inner surface 396 is not flat and defines a liner regression line 404. An angle between the outer surface 392 and the liner regression line 404, and thus the inner surface 396, is approximately 30 degrees. In other embodiments, an inner surface can be angled differently with respect to an outer surface. For example, an angle between an inner surface and an outer surface may be 0 degrees (i.e., so that the surfaces are parallel), between 25 degrees and 50 degrees, or greater than 50 degrees. Correspondingly, the lens 128 is configured to transmit light between from the top surface 388 and out of the outer surface 392. In that regard the top surface 388 acts as a light entering surface, the inner surface 396 act as a light reflecting surface (i.e., a reflective surface), the outer surface 392 acts as a light exiting surface.

In some cases, a lens can include light guiding or collecting structures to help collect light from a corresponding plurality of lighting elements, thereby improve the efficient of light transfer between the plurality of lighting elements and the lens. That is, such collecting structures increase the percentage of emitted light that passes through the lens. Such light collecting structures can be provided on a light entering surface of a lens (i.e., a light collecting surface). For example, a top surface or other light entering surface can, define guides or seats that can help guide and collect light from a lighting assembly. Such light collecting structures can be provided as separate structures apart or they may be integrally formed with a lens or lens element. In some cases, there can be a one-to-one correspondence between a light collecting structure of the lens and the lighting elements of the plurality of lighting elements. However, a light collecting structure may also be configured to correspond with more than one lighting element.

For example, the top surfaces 388 of each of the first lens element 364 and the second lens element 368 can define a plurality of seats 408 (e.g., raised or indented seats) that correspond with individual lighting elements or groups of lighting elements of the lighting assembly 108, as described in more detail below. The seats 408 can reduce the gap between a lighting element and a lens (e.g., a lens element). That is, any air that may be disposed between a lighting element and a lens, which can attenuate and dissipate light emitted by the lighting element, can be reduced. Additionally, some seats can be shaped to partially of fully surround a lighting element to help capture light (e.g., so as to at least partially receive a lighting element therein). In that regard, a seat can be a recessed seat that can include peripheral walls that can at least partially surround a lighting element to help to prevent light from traveling away from a lens. In some cases, such peripheral walls may be configured to reflect light back toward a lens. As a result, light can be more efficiently transferred to and collected by a lens. Correspondingly, the safety light can produce more intense or powerful light, which aids in improving visibility over long distances.

However, because light travels in straight lines, and the top surface 388 and the outer surface 392 are perpendicular to one another, light entering either of the first lens element 364 or the second lens element 368 must be directed (i.e., bent or reflected) within the respective lens element to pass from the top surface 388 and out of the outer surface 392. As illustrated, this change in the direction of travel of the light is caused by the prismatic nature of the lens 128 (e.g., each of the first lens element 364 and the second lens element 368), wherein, light reflects off of the inner surface 396. In particular, light entering the top surface 388 travels into the lens element (i.e., towards the second cap 124), where it reaches the inner surface 396. The angle of the light with respect to the inner surface 396 is such that the light is reflected (e.g., obliquely reflected) off of the inner surface 396 to continue out of the outer surface 392. Thus, the inner surface 396 is arranged so that the lens 128 transversely directs the light from the top surface 388 and out of the outer surface 392 (i.e., out of the periphery of the housing 104). In this case, the index of refraction of the material of the lens 128 is such that it causes total internal refraction of the light. In other embodiments, this may not always be the cause and an inner surface can be coated with a reflective material to aid in the reflection of light. In other embodiments, a lens may include other surfaces configured to reflect light.

Further, as mentioned above, the inner surface 396, as illustrated in the present embodiment, is not a flat surface. Rather, the inner surface 396 is configured as a faceted surface, with a plurality of sub-surfaces 412 that are at non-zero angles relative to one another. That is, the inner surface, defines a first plurality of facets or sub-surfaces 412A at a first angle, a second plurality of facets or sub-surfaces 412B at a second angle, and a third plurality of facets or sub-surfaces 412C at a third angle. Each of the first plurality of facets 412A, the second plurality of facets or sub-surfaces 412B, and the third plurality of facets 412C are arranged to form concave or scallop-like depressions 414 with peaks formed between adjacent depressions. In this case, the sub-surfaces 412 are also arranged in rows (i.e., parallel rows) running along the respective lens elements 364, 368 (see FIG. 26). That is, with respect to the first lens element 364, the sub-surfaces run through the first leg 372 along the first sidewall 132A and through the second leg 376. Here, the sub-surfaces 412 are arranged to form multiple areas having convex-like geometry with pointed ribs therebetween.

Continuing, a lighting assembly can generally include one or more lighting elements (i.e., light sources) configured to emit light. The light emitted from the lighting elements can be any color of visible (e.g., light with a wavelength between 380 nm to 780 nm), or infrared light (e.g., light with a wavelength between 780 nm to 1000 nm) or UV light (e.g., light with a wavelength between 100 nm to 380 nm), or any combination thereof. That is, each lighting element may be configured to only produce one color or type of light, or a lighting element can be configured to produce multiple colors or types of light, either simultaneously or separately. Such lighting elements can include LEDs (e.g., phosphor LEDs) and other types of known lighting elements, such as ceramic wafers that are encapsulated with a lens. Relatedly, a lighting assembly can further include a power source (e.g., a battery) to provide power to the lighting elements and a controller (i.e., a processor or microcontroller) that is configured to control the one or more lighting elements (individually or collectively as one or more groups) in response to an input (e.g., an input from an operator. In that regard, a controller can be configured to individually control (i.e., operate) each individual lighting element, and to control various groups or subsets of lighting elements together. Additionally, a lighting assembly may further include a circuit board (e.g., a printed circuit board, to which one or more components of the lighting assembly may be mounted (e.g., lighting elements, a controller, and/or a connection terminal).

Figure 28:
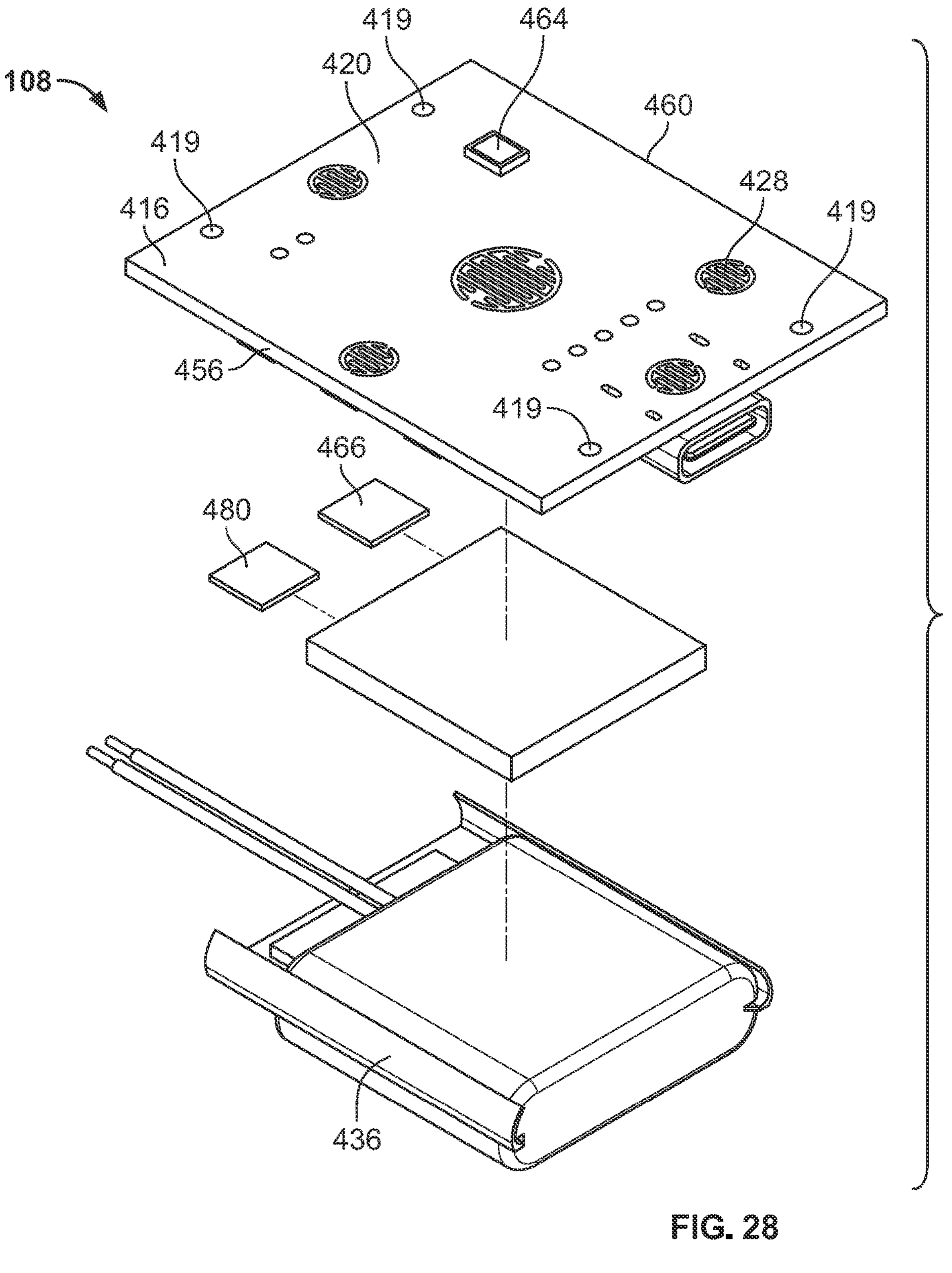
FIG. 28 is a detail view of a lighting assembly of the safety light FIG. 9.
Figure 29:
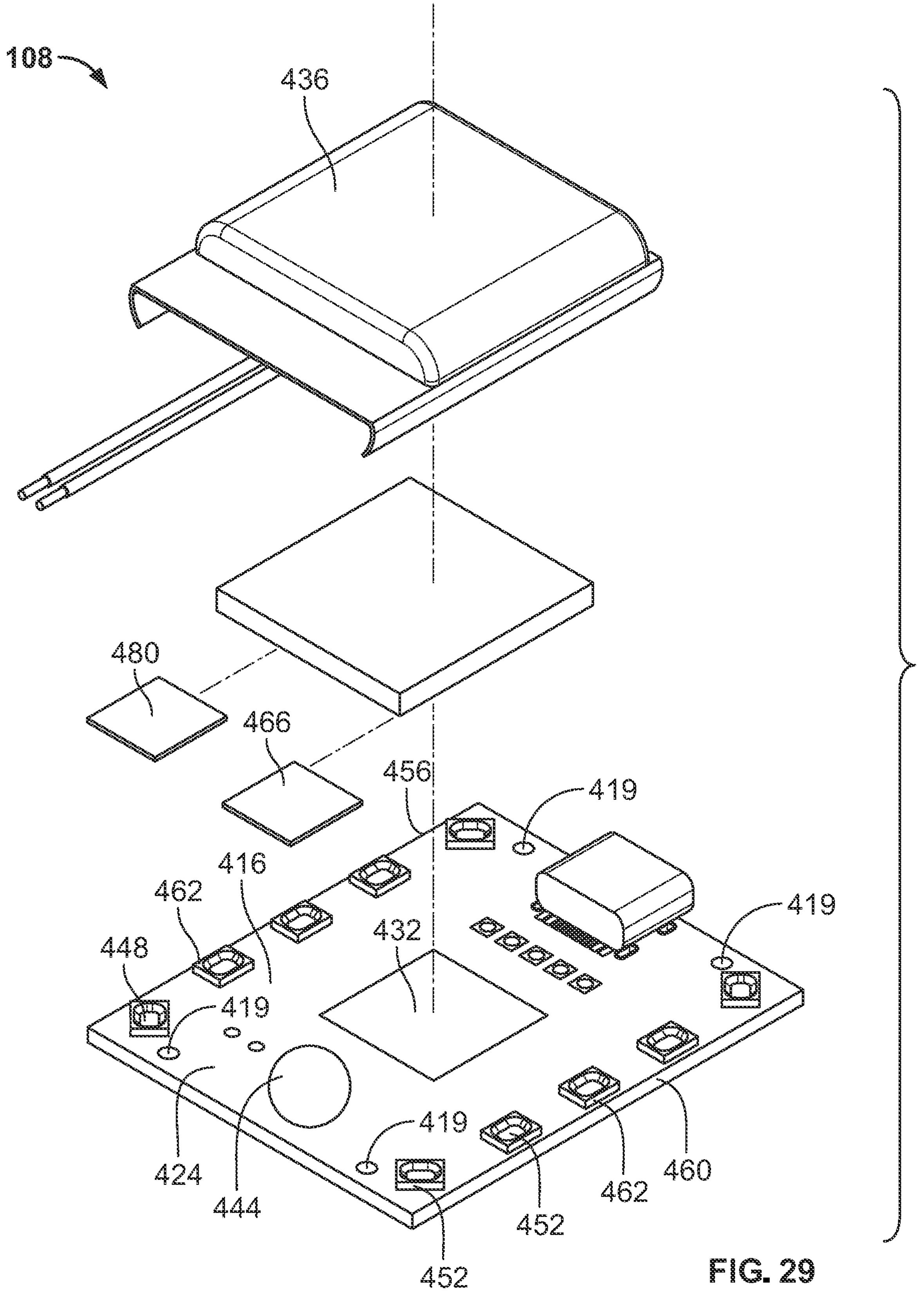
FIG. 29 is detail view of the lighting assembly as shown in FIG. 10.

For example, with additional reference to FIGS. 28 and 29, the lighting assembly 108, which is a non-limiting example of a lighting assembly, is shown in greater detail. The lighting assembly 108 includes a circuit board 416, which can be configured to support and/or electrically connect various electrical components. More specifically, the circuit board 416 is configured as a substantially planar body that defines a top of first side 420 opposite a bottom or second side 424, each of which can support one or more electrical components. Further, the circuit board 416 has a rectangular shape, however, circuit boards can be shaped differently in other embodiments.

Figure 9:
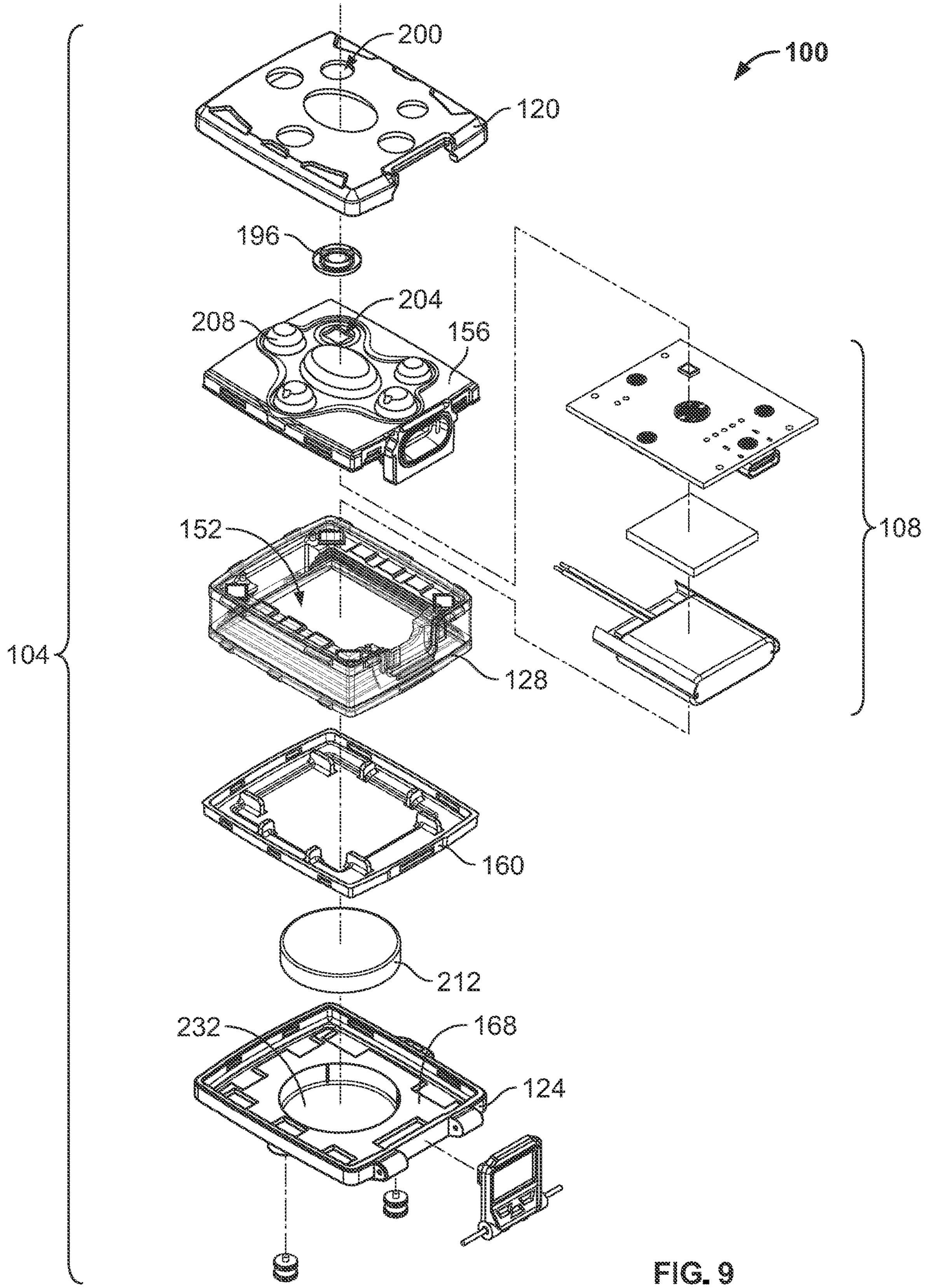
FIG. 9 is an exploded view of the safety light of FIG. 1.
Figure 10:
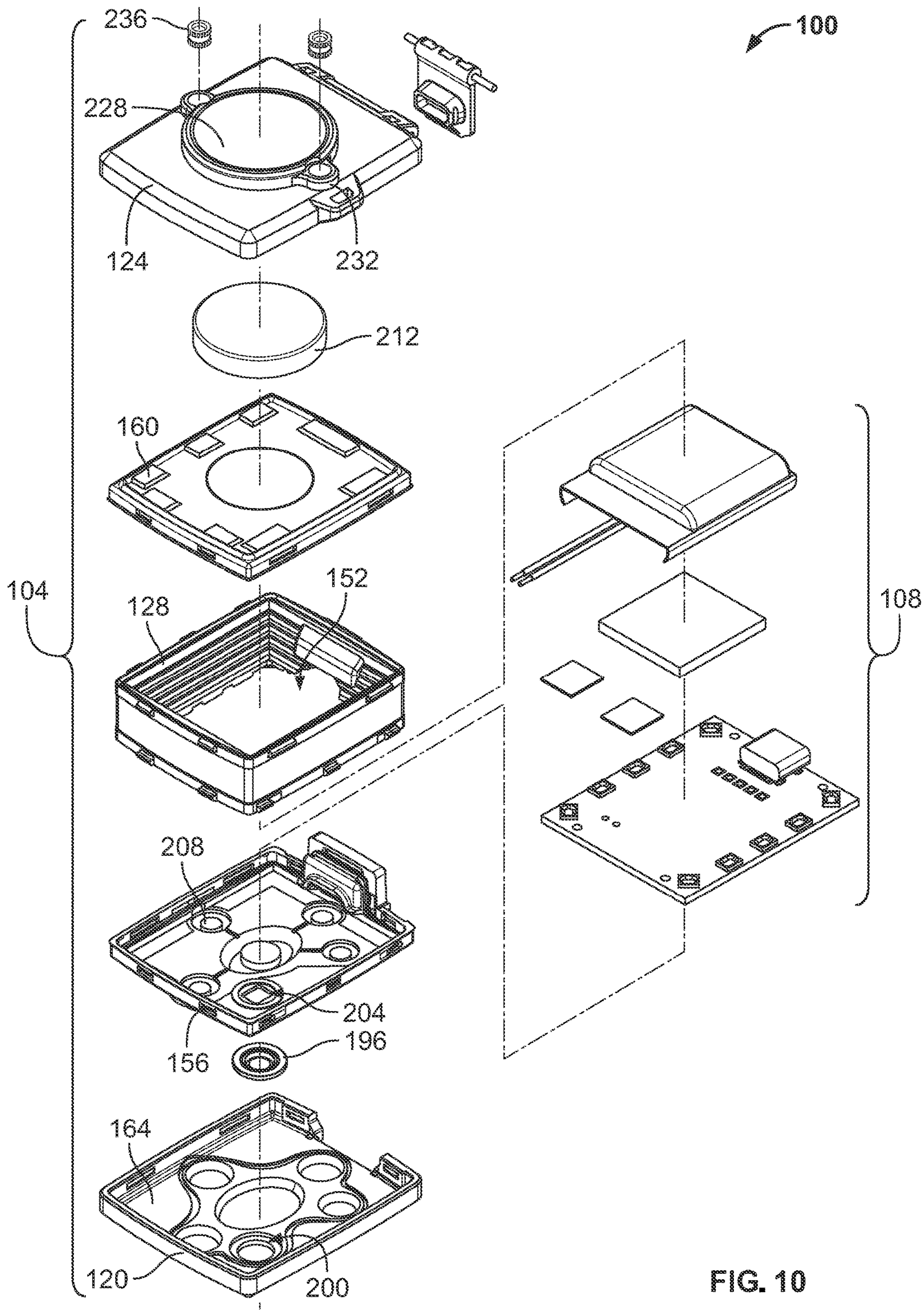
FIG. 10 is an exploded view of the safety light of FIG. 8.

In the instant case, the circuit board 416 includes capacitive areas 428 along the second side 424 which are arranged so that each capacitive area 428 aligns with a corresponding one of the plurality of buttons 208 (see FIG. 9). The capacitive areas 428 can provide input to a controller 432 (e.g., an electronic controller, for example, a processor) that is mounted to the second side 424 of the circuit board 416. As mentioned above, the controller 432 can be configured to carry out various functions of the safety light 100, including, for example, operating any lighting elements, communicating with external devices, and controlling the discharge of a power source. Additionally, the controller 432 can be configured to monitor, track (e.g., store), and/or communicate various operating parameters the safety light 100, for example, monitoring battery life, temperature, duration of operation, fault detection (e.g., non-operational lighting elements). Similarly, a lighting device can also be configured to monitor a user, for example, monitoring, tracking, and/or communicating biometric data (e.g., heartrate, temperature, fingerprints, and facial recognition).

Correspondingly, the circuit board 416 also supports the connection terminal 296 of the safety light and is (electrically) coupled to a power source that is configured to store energy for later use by the safety light 100. Here the power source is configured as a battery 436, and more specifically a lithium-ion battery, although other types of power sources, including batteries with different chemistries (e.g., alkaline, nickel metal hydride, lithium-iron-phosphate, etc.), which may or may not be rechargeable. Where power source is a non-rechargeable battery, a lighting device can be configured to permit replacement of the battery, for example, via an access port. Further, as shown in the illustrated embodiment, a power source can be indirectly supported by the circuit board 416 via wires 440 that electrically connect the power source to the circuit board 416, or a power source can be directly supported by the circuit board 416. In some embodiments, the wires 440 can removably couple (e.g., via a connector 444) to the circuit board 416 to allow for the battery 436 to be replaced. Such arrangements can provide for improved packaging within a housing of a lighting device, as described in greater detail below, as well as allowing for larger batteries to be used, thereby increasing runtime.

A circuit board can also support a plurality of lighting elements. The arrangement of any included lighting elements on the circuit board can be customized depending on the specific application to produce a desired output of light (e.g., an amount of light and/or a particular dispersion pattern). Correspondingly, various aspects of the lighting elements can be tuned to provide a desired output, including, for example, the quantity, size, power, and spacing/location of any lighting elements.

In that regard, a plurality of lighting elements for a lighting device can be generally arranged in accordance with a lens (e.g., to align with a lens) to emit light from the safety light. In particular, a lighting assembly, and hence a plurality of lighting elements can be disposed proximate a first cap of a housing, for example, to be disposed between the first cap and a lens. Accordingly, a lighting assembly can be configured to direct an emission of light from a plurality of lighting elements towards a second cap and into a lens. For example, as illustrated, the lighting assembly 108 supports a first plurality of lighting elements 448 and a second plurality of lighting elements 452 along the second side 424 of the circuit board 416. The first plurality of lighting elements 448 extends generally along and proximate a first edge 456 of the circuit board 416 and the second plurality of lighting elements 452 extends along a second edge 460 of circuit board 416, opposite the first edge 456. Here, each of the first plurality of lighting elements 448 and the second plurality of lighting elements 452 include five individual lighting elements, although more or fewer lighting elements may be used in other embodiments. Each of the first plurality of lighting elements 448 and the second plurality of lighting elements 452 are spaced approximately evenly along the respective edges of the circuit board 416 so as to align with the seats 408 of each of the first lens element 364 and the second lens element 368. In other embodiments, lighting elements can be arranged differently, for example, in multiple groups or clusters.

In some cases, a lens or a circuit board can be configured to maintain alignment between a lens and any respective lighting elements of a lighting assembly. For example, in some embodiments, as illustrated in FIGS. 26-29, an upper surface of the lens 128 (e.g., the top surfaces 388 of each of the first lens element 364 and the second lens element 368) can be recessed to receive the circuit board 416 therein. More specifically, the lens 128 can define one or more perimeter walls 389 that can help to retain the circuit board 416 so that the lighting elements 452 are aligned with the lens 128 (e.g., with the respective seats 408). In some embodiments, alignment between a lens and any respective lighting elements can be maintained in other ways. For example, with continued reference to FIGS. 26-29, the lens 128 can include one or more alignment posts 390 that can be received by one or more corresponding holes 419 provided in the circuit board 108.

Relatedly, where multiple lenses are provided, lighting elements can be provided for each lens. For example, as mentioned, the safety light 100 includes the second lens 196 to allow light to be emitted though the first cap 120, allowing the safety light 100 to emit light along more than just a perimeter of the safety light 100. Accordingly, the lighting assembly 108 includes a lighting element 464 along the first side 420 of the circuit board 416, which is in alignment with the second lens 196. In this case, the lighting element 464 is a single lighting element, but it may alternatively be configured as a plurality of lighting elements.

Relatedly, lighting elements can also be configured to guide any emitted light in a desired direction, for example, towards a lens or a light collecting structure of a lens. For example, a lighting element may not produce a columnated beam, but rather a diffuse emission of light. Accordingly, a reflector, for example a flat, spherical, or parabolic reflector, may be provided around the lighting element to guide light in a specific direction and/or to change a beam pattern produced by a lighting element. Such reflectors can, for example, produce columnated light, reduce diffusion, or focus light produced by the lighting element. In some cases, there can be a one-to-one correspondence between a reflector and the lighting elements of the plurality of lighting elements. However, a reflector may also be configured to correspond with more than one lighting element. Additionally, reflectors can be configured in a variety of shapes to achieve the desired output characteristics, for example, square, rectangular, round, ellipsoidal, and other polygonal or non-polygonal shapes. A reflector can be configured to work in conjunction with a light collecting element to further improve transfer efficient of light between a lighting element and a lens. For example, an outer perimeter of a reflector may have a shape which corresponds with a light collecting structure, and vice versa, to reduce the amount of light that travels away from a lens. In that regard, a reflector can be received in a recessed portion of a light collecting structure.

Figure 27:
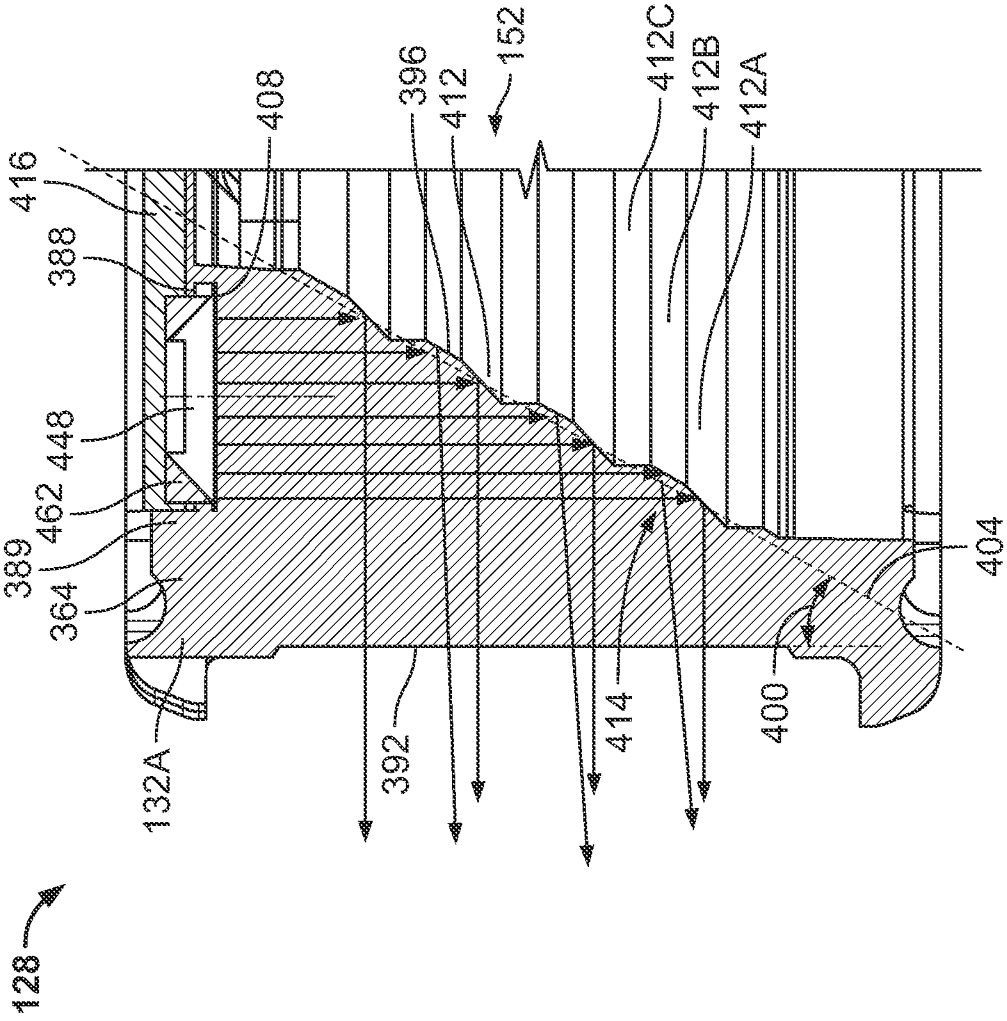
FIG. 27 is a partial cross section of the lens of FIG. 26, showing how light is emitted through the lens.

As illustrated in FIGS. 27 and 29, the lighting assembly 104 includes a plurality of reflectors 410. Here, a reflector 462 is provided for each lighting element of each of the first plurality of lighting elements 448 and the second plurality of lighting elements 452. Accordingly, there is a one-to-one correspondence between the reflectors 462 and each of the lighting elements of the first plurality of lighting elements 448 and the second plurality of lighting elements 452. Each reflector 462 is configured to reduce the spread of the light produced by the corresponding lighting element. That is, an individual lighting element (e.g., a phosphor LED) can produce a diffuse spread of light, or a beam of light with a wide beam angle. In particular, a beam angle (e.g., beam angle 448A shown in FIG. 27 can be approximately 120 degrees but may also be more than 120 degrees or less than 120 degrees. For example, a beam angle of lighting element can be 45 degrees to 60 degrees, 100 degrees to 120 degrees, 120 degrees to 140 degrees.

Figure 30:
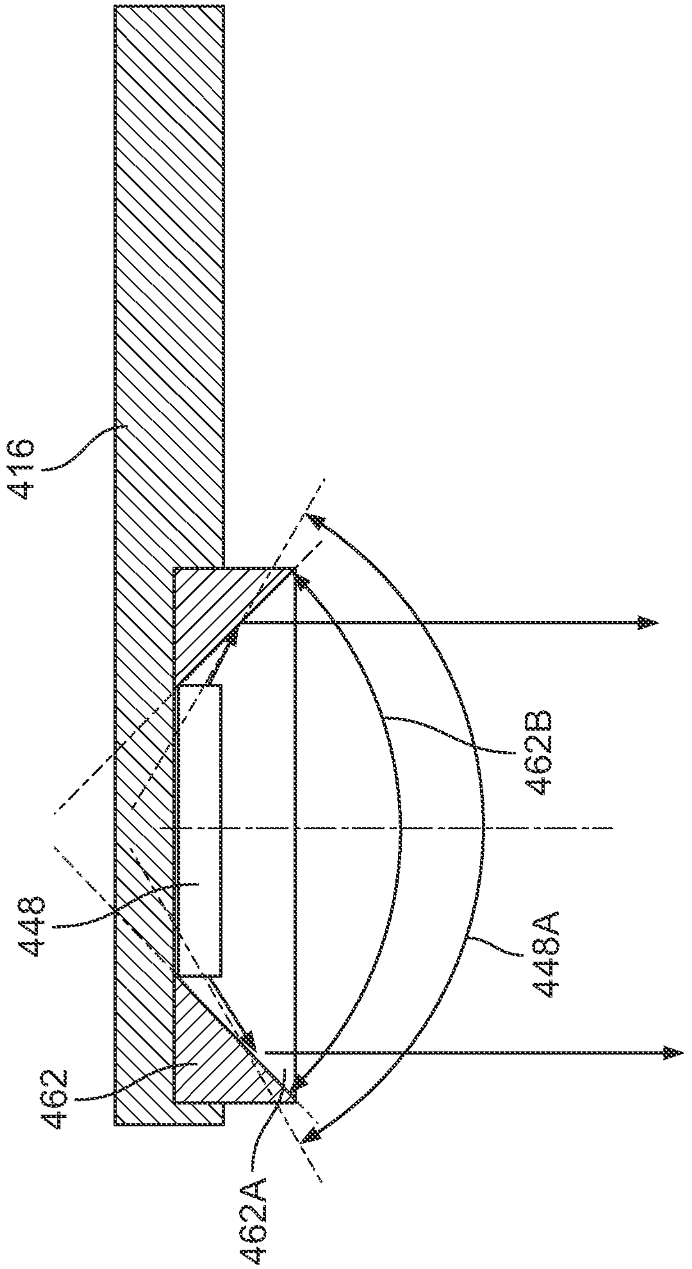
FIG. 30 is detail view of the lighting assembly as shown in FIG. 27.

Accordingly, with reference to FIG. 30 each reflector 462 can surround a corresponding lighting element and defines a reflector surface 462A that is configured to reflect the light from the lighting element. In that regard, the reflector surface 462A is configured to surround a perimeter of the lighting element. The reflector surface is configured to narrow a beam angle of the lighting element. Correspondingly, the reflector surface 462A is angled to reflect light with narrower beam angle, relative to the beam angle 448A of just the lighting element. For example, the reflector surface 462A defines a reflector beam angle 462B that is less than the corresponding beam angle 448A of the lighting element. In particular, the reflector beam angle 462B is approximately 90 degrees, by may also be more or less than 90 degrees depending on the specific application. In this way, light being emitted from the lighting element at an angle that is greater than the reflector beam angle 462B will reflect off of the reflector surface, thereby narrowing the output beam. Accordingly, the intensity of the light that is emitted from the safter light 100 or another lighting device can be maximized.

Figure 31:
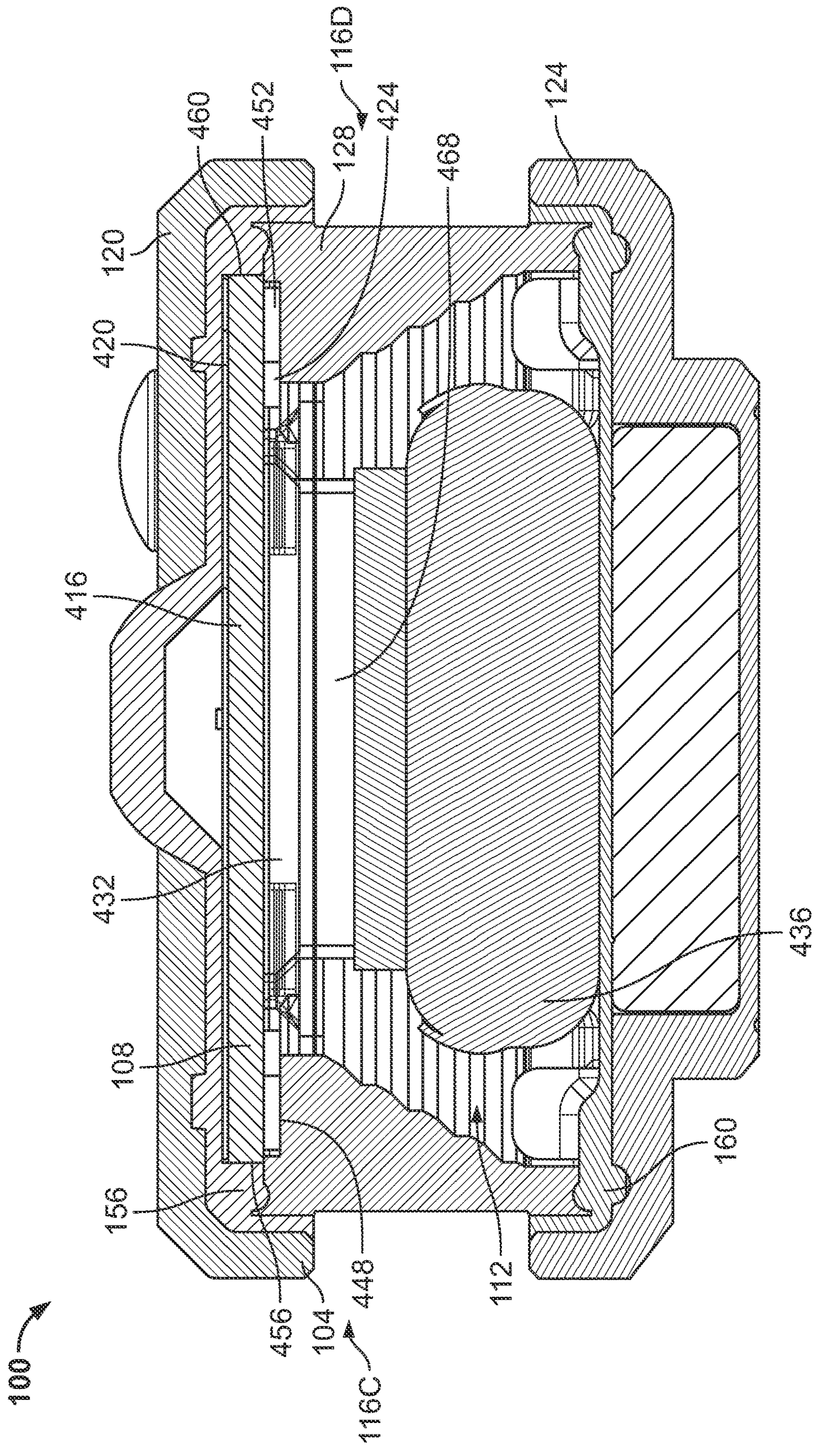
FIG. 31 is a cross sectional view of the safety light taken along line 31-31 in FIG. 2.

Such arrangements for lighting assemblies can also have benefits related to packaging the lighting assembly within a housing. For example, as illustrated in FIG. 31, the circuit board 416 can be disposed proximate the first cap 120, and more specifically, between the first side 140A of the lens 128 and the first gasket 156. In some cases, a recess may be provided a lens to locate a circuit board, or a circuit board can have a number of locating holes formed therein, which can be configured to receive a locating structure (e.g., pins) formed on a lens. Accordingly, the interior space 112 of the housing 104 is substantially open and the battery 436 can be disposed within the opening 152 of lens 128. Thus, the size of the battery 436 can be maximized, leading to longer run times.

However, the battery 436 does not have to take up entirety of the remaining portion of the interior space 112, which may allow for improved cooling, and also allow for other communication components to be retained within the safety light 100. For example, antennae processors, transponders, transmitters, transceivers, or antennae that can enable a lighting device to connect to external device Bluetooth, radio frequency (RF), and Wireless Fidelity (Wi-Fi), and cellular networks can be included. Correspondingly, such lighting devices can include microphones, speakers, and other components to allow for audio communications.

In that regard, the safety light 100 or other lighting device can include a communication module is configured to allow the safety light 100 to communicate with external devices (e.g., handheld devices, automobiles, infrastructure, etc.), including both one-way and two-way communications. For example, the safety light 100 can include a communication module 466 that is configured to communicate with one or more external devices. That is, the communication module 466 can be configured for sending or receiving wireless communications and other signals to allow for one-way or two-way communications. In particular, a communication device can be configured for vehicle-to-anything (V2X), vehicle-to-device (V2D), vehicle-to-network (V2N), vehicle-to-pedestrian (V2P), vehicle-to-infrastructure (V2I), or vehicle-to-vehicle (V2V) communication protocols to allow the communication device to communicate with a variety of external devices. Such communications can be made over WLAN-based (wireless local area network), cellular-based (e.g., 4G, 5G, etc. cellular networks), or DSRC-based (dedicated short range communication) networks.

As one example, the communication module 466 can be configured to provide two-way communication between the safety light 100 and an automobile or another transportation system (e.g., trucks, trains, boats, construction equipment, bicycles etc., or an auxiliary communication device thereof, such as a cellular phone or another communication device). Accordingly, the controller 432 can operate the safety light 100 in accordance with the presence of an automobile or other transportation system. In particular, the communication module 466 can be configured to receive a signal from an automobile, for example, a communication indicating that the automobile is nearby or approaching, or another type of signal (e.g., identification, location, heading/bearing, speed, etc.). In response to receiving the signal at the communication device 466, the controller 432 can then actuate one or more functions of the safety light 100 to provide a signal to the automobile (e.g., an operator of the automobile). For example, upon receiving a signal, the safety light 100 can be configured to activate one or more lighting elements (e.g., the first plurality of lighting elements 448, the second plurality of lighting elements 452, an emergency beacon, etc.) of the safety light 100 to provide a visual indication to the automobile (e.g., an operator of the automobile). Alternatively or additionally, the safety light 100, via the communication device 466, can be configured to send a signal back to the automobile to indicate the presence of the safety light 100 to the automobile, which can be, for example, an autonomous or semi-autonomous vehicle. In other embodiments, a safety light may activate other signaling functions, for example, emitting a noise to provide an audible signal.

Relatedly, in some cases, the safety light 100 can be configured to actuate one or more functions of the safety light 100 in accordance with a perceived danger. That is, the safety light 100, via the communication module 466, can receive a signal from an external device corresponding with a safety risk, and using the information contained in the signal, the controller 432 can control a function of the safety light 100 in accordance with a risk level of the perceived danger. For example, the communication module 466 can receive signal corresponding with a position, trajectory, or velocity of an automobile. At a first risk level, such as when the automobile is far away or traveling at a low speed, the safety light 100 may activate a lighting element at a first brightness or with a first pattern corresponding to the first risk level. However, at a second risk level, such as when the automobile is close or travelling a high rate of speed, which may pose a greater risk of collision or injury, the safety light 100 may activate additional functions (e.g., emitting an auditory signal) or may operate additional functions or modify a currently-activated function, for example, to activate a lighting element at a second brightness or with a second pattern of an emitted light. Put another way, the safety light 100, via the controller 432 and communication module 466, can control a first function in accordance with first risk level and can control second function in accordance with second risk level. The first function and the second function can be the same or different functions.

Correspondingly, the automobile, or an operator thereof, can be made aware of the presence of the safety light 100, and thus an individual or structure (e.g., a bicycle, traffic barrier, etc.) to which the safety light 100 is attached, and may take an appropriate course of action to avoid a collision or otherwise pass safely. Likewise, if the safety light 100 is being worn by an individual, activation of the one or more functions of the safety light 100 can also serve to provide a warning to that individual of a potential or impending safety hazard.

Moreover, because a communication device can communicate with surrounding devices, a safety light can also be configured to actuate a function of the safety light under specific conditions. That is, taking the above as an example, the safety light 100 can remain in an inactive or standby state when not in the vicinity of another device or when there is no perceived danger, such that no functions of the safety light 100 are active, except for the communication module 466 or another manually-activated or background function (e.g., GPS functionality). Correspondingly, the safety light 100 may transition to an active state when in the vicinity of another device or when there is a perceived danger, in which the safety light 100 actuates one or more functions of the safety light 100 (e.g., to automatically actuate in accordance with a received communication). In this way, an operating time of the safety light 100 can be increased because power consumption (e.g., electrical power from the battery 436) is reduced in the standby state, as compared with the active state.

Continuing, a lighting assembly can further include a cushion 468 (e.g., a resilient spacer) to prevent the battery 436 from shifting within the interior space 112. As such, the cushion 468 may be compressed (e.g., pre-loaded) between the battery 436 and the circuit board 416, although other configurations are possible.

In some cases, a circuit board can be configured to dissipate heat to reduce the chances of malfunction or permanent damage to a lighting device. For example, in the present embodiment, the lighting elements can be configured as LEDs, and more specifically, phosphor LEDs, which can provide high intensity light while also keeping power consumption low. However, such LEDs generate heat when powered. Likewise, the charging and discharging of a battery can result in heat being generated (e.g., via resistive heating). Relatedly, an operating environment can also result in appreciable heat transfer to the safety light, for example, when being used in direct sunlight and or other hot environments, such as near fires. If a lighting device heats up beyond an upper limit, the safety light can malfunction or be permanently damaged.

Accordingly, a circuit board can be configured to dissipate heat from one or more connected components. In particular, a circuit board can be a multi-layer circuit board with one or more heat dissipation layers. For example, the heat dissipation layers may form or include heat sinks. The heat dissipation layers can be made from materials with high thermal conductivity and/or capacity, for example, copper and aluminum, to absorb and transfer heat away from sensitive components. Heat dissipation layers can be provided as internal layers or external layers of a circuit board. For example, heat dissipation layer can be arranged with non-heat dissipating layers or circuit layers (e.g., layers with circuit traces). In some cases, heat dissipation layers can be alternated with circuit layers, so that every other layer is a heat dissipation layer. In other cases, multiple heat dissipation layers may be adjacent to one another so that they are in contact. Further, it is preferable, that a heat dissipation layer be an unbroken or solid layer to improve heat transfer, however, this is not necessary. That is, a heat dissipation layer, in some applications, may not include circuit traces, which can reduce heat transfer capability and thus reduce cooling performance and efficiency, Moreover, heat dissipation layers may also be used to electrically couple components on separate layers (e.g., separate circuit layers).

Figure 32:
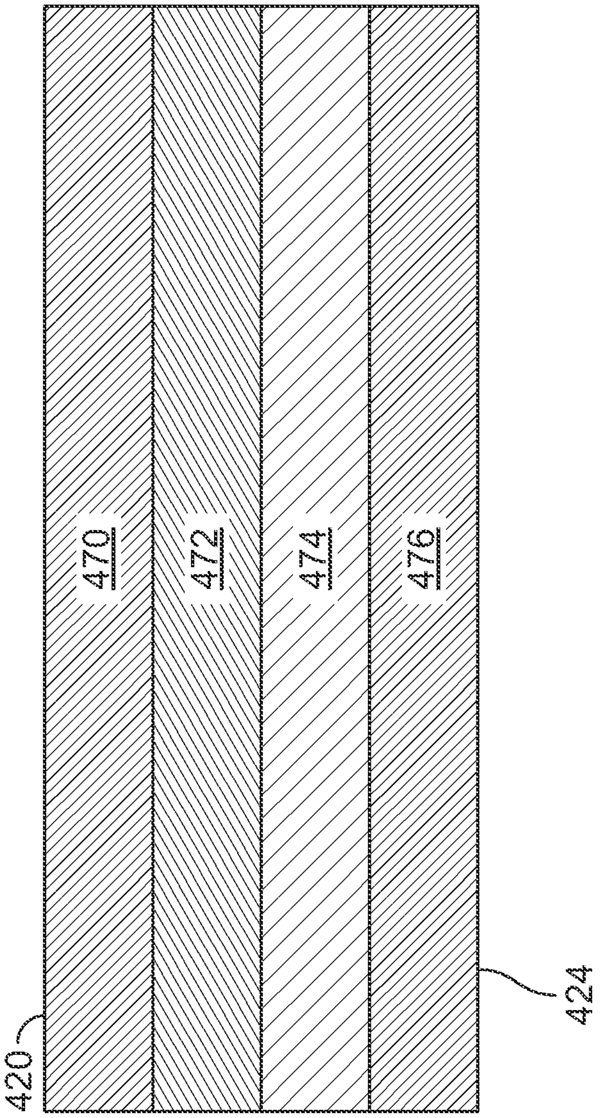
FIG. 32 is a schematic view of a multi-layered circuit board according to aspects of the disclosure.

For example, with regard to FIG. 32, a schematic cross section of the circuit board 416 is illustrated. The circuit board 416 is configured as a multi-layer circuit board with a plurality of heat dissipation layers and a plurality of circuit layers (i.e., layers that are not specifically configured to dissipate heat, although some heat may still be dissipated through such layers). The heat dissipation layers are configured as internal layers that are book-ended by circuit layers. In particular, moving from the first side 420 to the second side 424 the circuit board 416 includes a first layer 470 configured as a first circuit layer, which defines the first side 420, a second layer 472 configured as a first heat dissipation layer, a third layer 474 configured as a second heat dissipation layer, and a fourth layer 476 configured as a second circuit layer, which defines the second side 424.

Each of the first layer 470 and the fourth layer 476, included circuit traces that interrupt the surfaces of the respective layers. Accordingly, each of the first layer 470 and the fourth layer 476 can support and electrically couple to various electrical components. In some cases, the first layer 470 and the fourth layer 476 may be electrically connected with one another. That is, even though circuit layers may be physically separated from one another, they may still be electrically coupled. Continuing, each of the second layer 472 and the third layer 474 are disposed between the first layer 470 and the fourth layer 476 so that the second layer 472 and the third layer 474 are in contact with one another. Additionally, the second layer 472 is in contact with the first layer 470 and the third layer 474 is in contact with the fourth layer 476. Accordingly, the second layer 472 can absorb and dissipate heat form any components secured to the first layer 470 and the third layer 474 can absorb and dissipate heat form any components secured to the fourth layer 476.

In some cases, a temperature gradient may form across the various layers, in particular, the heat dissipation layers 472, 474. For example, heat may be transferred to each of the second layer 472 and the third layer 474 at differing rates, causing one of the layers to become hotter than the other. In such scenarios, heat from the hotter layer can flow to the cooler layer, thereby improving heat dissipation further. More specifically, if the third layer 474 were hotter than the second layer 472, heat could flow from the third layer 474 to the second layer 472. Accordingly, the second layer 472 can cool the third layer 474, thereby allowing more heat to be pulled from the fourth layer 476 by the third layer 474. At the same time the second layer 472 can increase in temperature, and therefore dissipate greater amounts of heat to improve cooling for the system as a whole.

Relatedly, circuit boards, other electrical components, and non-electrical components, may include cooling features or structures to dissipate heat. For example, heat sinks, fans, and vapor chambers can be used to cool components. Further, heat transfer may also be improved by including thermally conductive materials between components, for example, thermal pastes and thermal pads.

In other embodiments, a lighting device can also be configured to provide GPS capabilities. For example, a lighting device can include a GPS unit having a GPS transponder to send and/or receive communications from a GPS. In particular, a GPS transponder can be configured to connect and communicate with one or more GPS networks (e.g., Galileo, GLONASS, GPS, QZSS). Additionally, a GPS unit can be configured to store location data and/or track safety light during use. Such data can be transmitted to a central server or other management system. In particular, as illustrated in FIGS. 28 and 29, the safety light 100 includes a GPS unit 480 that is operatively coupled (e.g., electrically coupled) to the circuit board 416, and thus the controller 432. In other embodiments, a GPS unit can be physically coupled so as to be support by a circuit board.

As used in the claims, the phrase "at least one of A, B, and C" means at least one of A, at least one of B, and/or at least one of C, or any one of A, B, or C or combination of A, B, or C. A, B, and C are elements of a list, and A, B, and C may be anything contained in the Specification.

The present invention has been described in terms of one or more preferred embodiments, and it should be appreciated that many equivalents, alternatives, variations, and modifications, aside from those expressly stated, are possible and within the scope of the invention.

The invention claimed is:

1. A light system comprising:

a housing including a lens that forms a periphery of the housing;

a lighting assembly arranged within the housing, the lighting assembly including a plurality of lighting elements configured to emit light, wherein the lens is configured to receive the light emitted by the plurality of lighting elements and direct the light toward the periphery of the housing;

a control interface coupled to the housing, the control interface configured to receive a user input;

a communication module configured to communicate with an external device; and an electronic controller positioned in the housing, the electronic controller in communication with the communication module and configured to activate the plurality of lighting elements in accordance with the user input at the control interface and a signal received by the communication module.

2. The light system of claim 1, wherein the housing further includes a first cap and a second cap arranged in opposition to the first cap so that the lens is arranged between the first cap and the second cap to form the periphery of the housing.

3. The light system of claim 2, wherein the lighting assembly is arranged proximate to the first cap and the plurality of lighting elements is configured to emit light toward the second cap.

4. The light system of claim 3, wherein the second cap includes a magnet.

5. The light system of claim 4, wherein the second cap includes a projection extending outwardly from the second cap and the magnet is secured within the projection.

6. The light system of claim 1, wherein the light emitted by the plurality of lighting elements is visible for at least three hundred sixty degrees around the housing.

7. The light system of claim 1, wherein the lighting assembly, the communication module, and the electronic controller are coupled to a printed circuit board.

8. The light system of claim 7, wherein the printed circuit board includes:

a first circuit layer;

a second circuit layer;

a first heat dissipation layer disposed between the first circuit layer and the second circuit layer; and a second heat dissipation layer disposed between the first circuit layer and the second circuit layer.

9. The light system of claim 8, wherein the plurality of lighting elements is coupled to the first circuit layer, and wherein heat generated by the plurality of lighting elements is dissipated through each of the first heat dissipation layer and the second heat dissipation layer.

10. The light system of claim 1, wherein the electronic controller is configured to determine a first risk level and a second risk level, and to activate the plurality of lighting elements at first brightness or with a first pattern corresponding to the first risk level, and to activate the plurality of lighting elements at a second brightness or with a second pattern corresponding to the second risk level.

11. A light system comprising:

a housing including a first cap, a second cap, and a lens arranged between the first cap and the second cap to form a periphery of the housing;

a lighting assembly arranged within the housing, the lighting assembly including a plurality of lighting elements configured to emit light toward the lens to be directed from the periphery of the housing so that the light is visible at least three hundred sixty degrees around the housing;

a control interface coupled to the housing, the control interface configured to receive a user input;

a communication module configured to communicate with an external device; and an electronic controller positioned in the housing, the electronic controller in communication with the communication module and configured to transition the light system between a standby state and an active state in accordance with the user input at the control interface and a signal received by the communication module.

12. The light system of claim 11, wherein, in the active state, the electronic controller is configured to determine a first risk level, and to activate a first function of the light system in accordance with the first risk level, the first function including activating the plurality of lighting elements.

13. The light system of claim 12, wherein, in the active state, the electronic controller is configured to determine a second risk level, and to activate a second function of the light system in accordance with the second risk level, the second function including activating at least one of the plurality of lighting elements and a speaker configured to emit an auditory signal.

14. The light system of claim 11, wherein the lens includes a waveguide having a reflecting surface that is configured to receive the light emitted by the plurality of lighting elements and to direct the light toward the periphery of the housing.

15. The light system of claim 11, further comprising a connection interface configured to couple to a support structure.

16. The lighting system of claim 11, wherein the control interface is configured to allow user to control one or more functions of the lighting system, the control interface including at least one of a physical control interface and a virtual control interface.

17. A lighting system comprising:

a housing including a first cap, a second cap, and a lens arranged between the first cap and the second cap to form a periphery of the housing, the lens including a plurality of light collecting structures;

a circuit board positioned between the first cap and the lens;

a plurality of lighting elements coupled to the circuit board and arranged to emit light toward the plurality of light collecting structures so that the light is directed from the periphery of the housing;

a user interface coupled to the housing, the user interface configured to receive a user input;

a communication module configured to communicate with an external device; and an electronic controller positioned in the housing, the electronic controller in communication with the communication module and configured to control the emission of light from the plurality of lighting elements based on the user input at the user control interface and a signal received by the communication module from the external device.

18. The lighting system of claim 17, wherein the plurality of lighting elements are configured to emit light toward the second cap, and wherein the lens includes a waveguide having a reflecting surface that is configured to receive the light emitted by the plurality of lighting elements and to direct the light from the periphery of the housing.

19. The lighting system of claim 17, wherein the external device includes the user interface, the user interface being configured to allow a user to control the emission of light from the plurality of lighting elements.

20. A lighting system comprising:

an external device including a control interface; and a first lighting device and a second lighting device, each of the first lighting device and the second lighting device including:

a housing including a first cap, a second cap, and a lens arranged between the first cap and the second cap to form a periphery of the housing, the lens including a plurality of light collecting structures;

a circuit board positioned between the first cap and the lens;

a plurality of lighting elements coupled to the circuit board and arranged to emit light toward the plurality of light collecting structures so that the light is directed from the periphery of the housing; and a communication module configured to communicate with the external device.

21. The lighting system of claim 20, wherein the plurality of lighting elements of the first lighting device includes a plurality of white lighting elements; and wherein the plurality of lighting elements of the second lighting device includes a plurality of red lighting elements and a plurality of green lighting elements.

* * * * *